(12) United States Patent
Miyamoto et al.

(10) Patent No.: US 10,963,058 B2
(45) Date of Patent: Mar. 30, 2021

(54) DRIVE CONTROLLER, ELECTRONIC DEVICE, AND DRIVE CONTROL METHOD

(71) Applicant: FUJITSU LIMITED, Kawasaki (JP)

(72) Inventors: Akinori Miyamoto, Sagamihara (JP); Kiyoshi Taninaka, Ebina (JP); Yuichi Kamata, Isehara (JP); Sachihiro Youoku, Isehara (JP); yasuhiro endo, Ebina (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/714,849

(22) Filed: Dec. 16, 2019

(65) Prior Publication Data

US 2020/0117281 A1 Apr. 16, 2020

Related U.S. Application Data

(63) Continuation of application No. PCT/JP2017/023731, filed on Jun. 28, 2017.

(51) Int. Cl.
*G06F 3/01* (2006.01)

(52) U.S. Cl.
CPC .................................. *G06F 3/016* (2013.01)

(58) Field of Classification Search
CPC ........................................................ G06F 3/016
USPC ........................................................ 340/407.2
See application file for complete search history.

(56) References Cited

U.S. PATENT DOCUMENTS

| | | | |
|---|---|---|---|
| 4,325,112 A | 4/1982 | Otsuka | |
| 2006/0119573 A1 | 6/2006 | Grant et al. | |
| 2006/0144173 A1 | 7/2006 | Taghezout | |
| 2006/0290662 A1* | 12/2006 | Houston | ............... A63F 13/06 345/156 |
| 2007/0194660 A1* | 8/2007 | Hashimoto | ............. G04C 3/12 310/316.01 |

(Continued)

FOREIGN PATENT DOCUMENTS

| | | |
|---|---|---|
| JP | 56-107788 A | 8/1981 |
| JP | 63-503511 A | 12/1988 |

(Continued)

OTHER PUBLICATIONS

International Search Report and Written Opinion of the International Searching Authority with Partial English Translation (Form PCT/ISA/210, 220, and 237), mailed in connection with PCT Application No. PCT/JP2017/023731 dated Sep. 12, 2017, 15 pages.

(Continued)

*Primary Examiner* — Kerri L McNally
(74) *Attorney, Agent, or Firm* — Fujitsu Patent Center

(57) ABSTRACT

A drive controller includes a pulse generator configured to generate a pulse width modulation signal by modifying a period of at least one cycle of a plurality of cycles of the pulse width modulation signal for synchronizing the plurality of cycles of the pulse width modulation signal with one cycle of a drive signal, and a drive circuit configured to generate the drive signal based on the pulse width modulation signal generated by the pulse generator, and drive a vibration element coupled to a panel of an electronic device on a basis of the generated drive signal for generating vibration in an ultrasonic band on the panel.

11 Claims, 21 Drawing Sheets

(56) References Cited

U.S. PATENT DOCUMENTS

| | | | | |
|---|---|---|---|---|
| 2010/0110018 A1* | 5/2010 | Faubert | .................. | G06F 3/016 345/173 |
| 2013/0334988 A1* | 12/2013 | Iwasa | ..................... | H02N 2/142 318/116 |
| 2015/0324023 A1* | 11/2015 | Guo | ........................ | G06F 3/044 345/173 |

FOREIGN PATENT DOCUMENTS

| | | | |
|---|---|---|---|
| JP | 2005-258666 A | | 9/2005 |
| JP | 2006-159188 A | | 6/2006 |
| JP | 2008-521597 A | | 6/2008 |
| JP | 2009-245105 A | | 10/2009 |
| JP | 2009245105 A | * | 10/2009 |
| JP | 2014-89550 A | | 5/2014 |

OTHER PUBLICATIONS

Japanese Office Action dated Dec. 15, 2020 for corresponding Japanese Patent Application No. 2019-526460, with English Translation, 9 pages. *Please note JP-2009-245105-A, JP-63-503511-A and JP-56-107788-A cited herewith, were previously cited in an IDS filed Dec. 16, 2019.*.

* cited by examiner

FIG. 13

| APPLICATION ID | AREA DATA | VIBRATION PATTERN |
|---|---|---|
| 1 | f1=(X,Y) | P1 |
| 1 | f2=(X,Y) | P2 |
| 1 | f3=(X,Y) | P3 |
| 1 | f4=(X,Y) | P4 |
| | | |

DRIVE CONTROLLER, ELECTRONIC DEVICE, AND DRIVE CONTROL METHOD

CROSS-REFERENCE TO RELATED APPLICATION

This application is a continuation application of International Application PCT/JP2017/023731 filed on Jun. 28, 2017 and designated the U.S., the entire contents of which are incorporated herein by reference.

FIELD

The present invention relates to drive control technology.

BACKGROUND

There has been conventionally known an operation device that includes a push operation mechanism capable of performing push operation, a tactile sense presenting means that presents a sense of operation by driving the push operation mechanism using a drive unit, and a drive control unit that intermittently drives the drive unit using drive control signals generated on the basis of intermittent signals at unequal intervals and pulse width modulation (PWM) signals set to a predetermined modulation frequency (e.g., Patent Document 1).

Related-art techniques are disclosed in Japanese National Publication of International Patent Application No. 2008-521597, for example

SUMMARY

According to an aspect of the embodiments, a drive controller includes a pulse generator configured to generate a pulse width modulation signal by modifying a period of at least one cycle of a plurality of cycles of the pulse width modulation signal for synchronizing the plurality of cycles of the pulse width modulation signal with one cycle of a drive signal, and a drive circuit configured to generate the drive signal based on the pulse width modulation signal generated by the pulse generator, and drive a vibration element coupled to a panel of an electronic device on a basis of the generated drive signal for generating vibration in an ultrasonic band on the panel.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 13 is a table illustrating data to be stored in a memory.

DESCRIPTION OF EMBODIMENTS

A conventional operation device (electronic device) fails to disclose generating vibration in the push operation mechanism by driving a vibrating element using drive signals for generating natural vibration in the ultrasonic band.

In a case where, at the time of generating the natural vibration in the ultrasonic band on an operation surface by driving the vibrating element with the drive signals, a cycle of a waveform like a sine wave of the drive signal is not an integral multiple of a cycle of the PWM signal and a remainder is left, the end point of the cycle of the waveform does not coincide with the end point of the cycle of the PWM signal in the remaining period. The end point of the cycle of the waveform is equal to the start point of the next cycle of the waveform.

Accordingly, noise may be generated due to the fact that the drive signal and the PWM signal are not synchronized at the end point (start point) of the waveform, which may cause unusual noise and the like.

Hereinafter, an embodiment to which a drive controller, an electronic device, and a drive control method according to the present invention are applied will be described.

Figure 1:
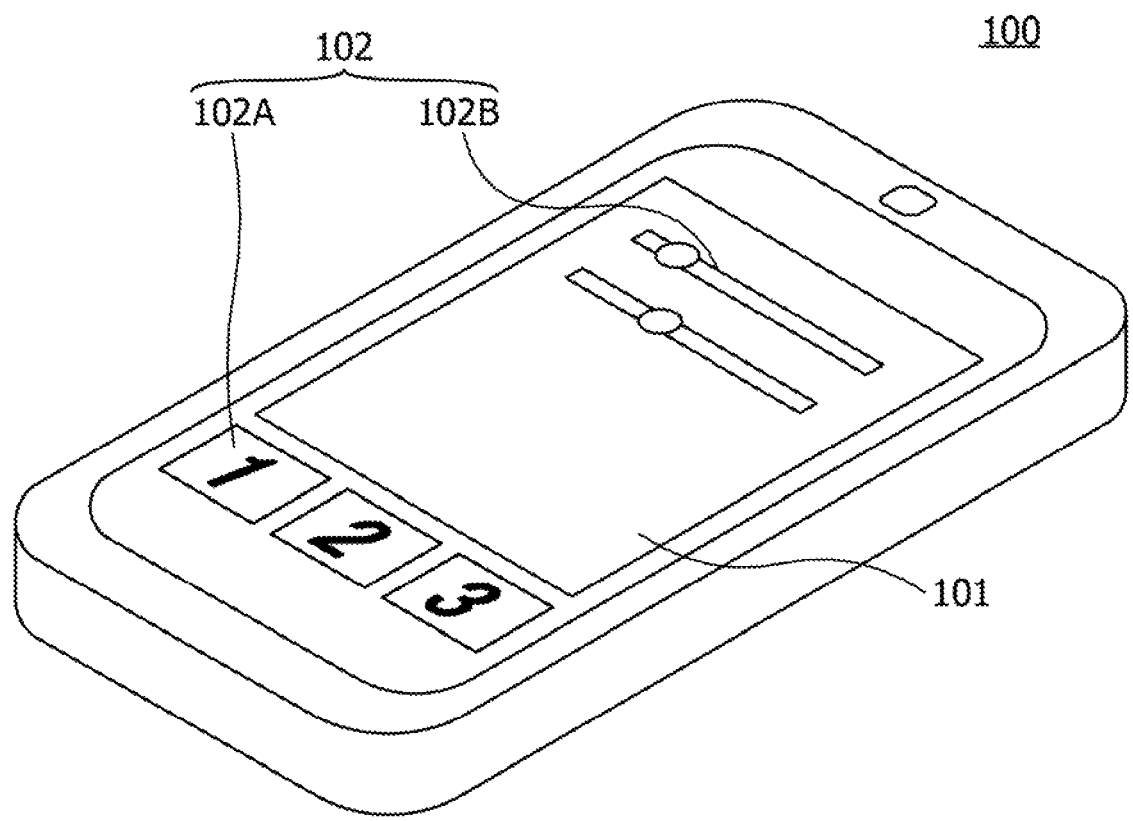
FIG. 1 is a perspective view illustrating an electronic device according to an embodiment.

FIG. 1 is a perspective view illustrating an electronic device 100 according to an embodiment.

Examples of the electronic device 100 include a smartphone terminal, a tablet computer, a game machine, and the like using a touch panel as an input operation unit. Since it is sufficient if the electronic device 100 is a device using a touch panel as an input operation unit, it may be, for example, a mobile information terminal, or a device installed and used at a specific place, such as an automatic teller machine (ATM). Furthermore, the electronic device 100 may be an in-vehicle input device.

The electronic device 100 includes an input operation unit 101 in which a display panel is disposed below the touch panel, and various buttons 102A, sliders 102B, or the like using a graphic user interface (GUI) (hereinafter referred to as GUI operation unit 102) are displayed on the display panel.

A user of the electronic device 100 normally touches the input operation unit 101 with his/her fingertip to operate the GUI operation unit 102.

Next, a specific configuration of the electronic device 100 will be described with reference to FIG. 2.

Figure 2:
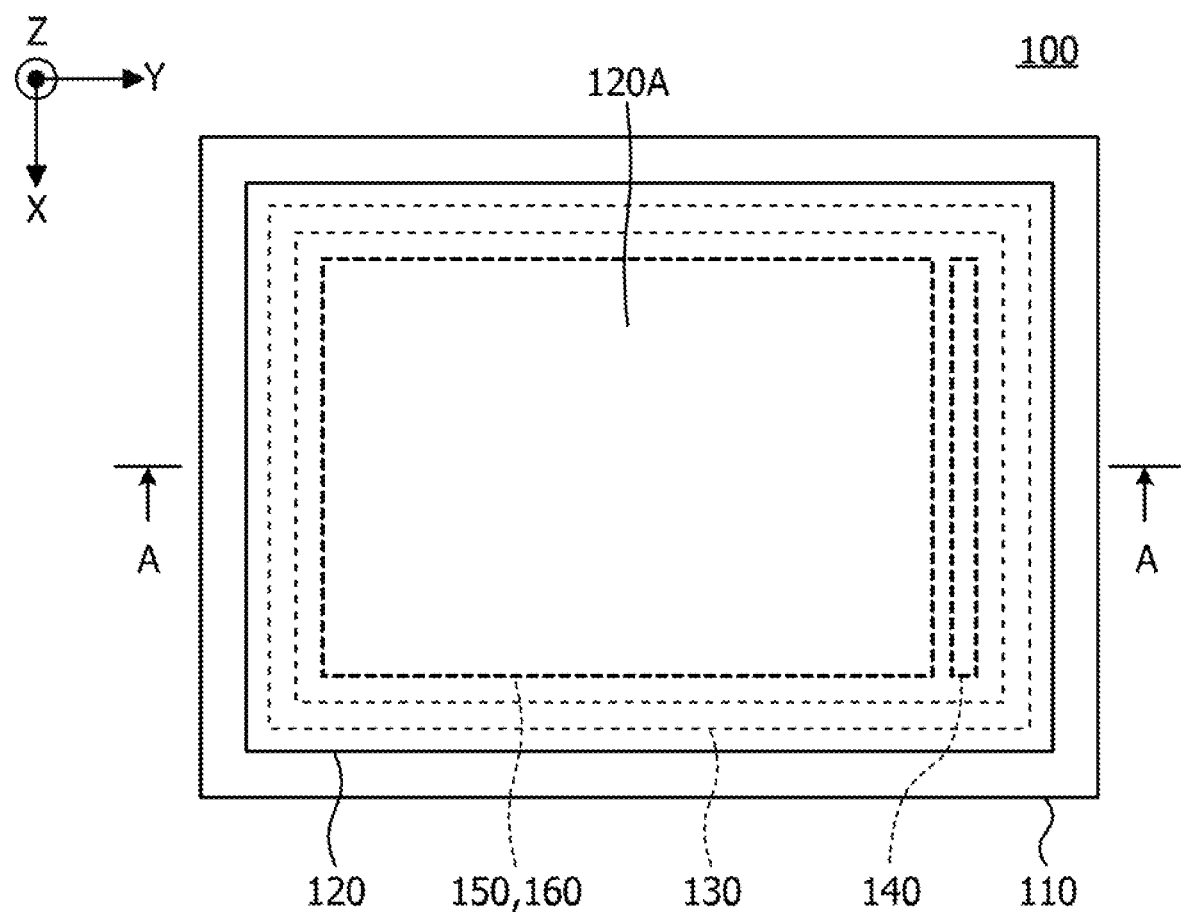
FIG. 2 is a plan view illustrating the electronic device according to the embodiment.
Figure 3:
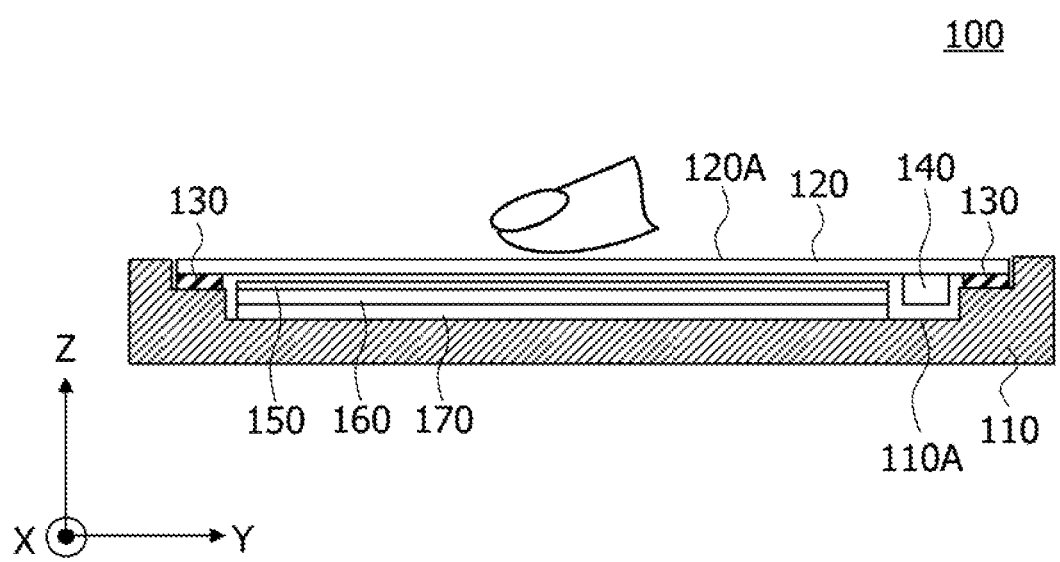
FIG. 3 is a view illustrating a cross section with arrows taken along line A-A of the electronic device illustrated in FIG. 2.

FIG. 2 is a plan view illustrating the electronic device 100 according to the embodiment, and FIG. 3 is a view illustrating a cross section with arrows taken along line A-A of the electronic device 100 illustrated in FIG. 2. Note that an XYZ coordinate system, which is an orthogonal coordinate system, is defined as illustrated in FIGS. 2 and 3.

The electronic device 100 includes a housing 110, a top panel 120, double-sided tape 130, a vibrating element 140, a touch panel 150, a display panel 160, and a substrate 170.

The housing 110 is made of, for example, resin, and as illustrated in FIG. 3, the substrate 170, the display panel 160, and the touch panel 150 are disposed in a recess 110A, and the top panel 120 is bonded by the double-sided tape 130.

The top panel 120 is a thin tabular member that is rectangular in a plan view, and is made of transparent glass or plastic, such as polycarbonate. A surface 120A (surface on the Z-axis positive direction side) of the top panel 120 is an exemplary operation surface on which the user of the electronic device 100 performs operational input.

On the top panel 120, the vibrating element 140 is bonded to the surface on the Z-axis negative direction side, and four sides in a plan view are bonded to the housing 110 by the double-sided tape 130. Note that the double-sided tape 130 only needs to be capable of bonding the four sides of the top panel 120 to the housing 110, and does not need to be a rectangular ring as illustrated in FIG. 3.

The touch panel 150 is disposed on the Z-axis negative direction side of the top panel 120. The top panel 120 is provided to protect the surface of the touch panel 150. Note that another panel, a protective film, or the like may be further provided on the surface of the top panel 120.

The top panel 120 vibrates when the vibrating element 140 is driven in the state where the vibrating element 140 is bonded to the surface on the Z-axis negative direction side. In the embodiment, the top panel 120 is vibrated at the natural vibration frequency of the top panel 120 to generate standing waves in the top panel 120. However, since the vibrating element 140 is bonded to the top panel 120, it is practically preferable to determine the natural vibration frequency in consideration of the weight of the vibrating element 140 and the like.

The vibrating element 140 is bonded to the surface of the top panel 120 on the Z-axis negative direction side along the short side extending in the X-axis direction on the Y-axis positive direction side. It is sufficient if the vibrating element 140 is an element capable of generating vibration in the ultrasonic band, and for example, an element including a piezoelectric element, such as a PZT element, can be used.

The vibrating element 140 is driven by drive signals output from a drive controller to be described later. The amplitude (intensity) and the frequency of vibration generated by the vibrating element 140 are set by the drive signals. In addition, on/off of the vibrating element 140 is controlled by the drive signals.

Note that the ultrasonic band refers to a frequency band of about 20 kHz or more, for example. In the electronic device 100 according to the embodiment, the frequency at which the vibrating element 140 vibrates is equal to the frequency of the top panel 120, whereby the vibrating element 140 is driven by the drive signals to vibrate at the natural frequency of the top panel 120.

The touch panel 150 is disposed on the display panel 160 (Z-axis positive direction side) and under the top panel 120 (Z-axis negative direction side). The touch panel 150 is an exemplary coordinate detection unit that detects a position (hereinafter referred to as operational input position) at which the user of the electronic device 100 touches the top panel 120.

Various buttons and the like using the GUI (hereinafter referred to as GUI operation unit) are displayed on the display panel 160 under the touch panel 150. Accordingly, the user of the electronic device 100 normally touches the top panel 120 with his/her fingertip to operate the GUI operation unit.

It is sufficient if the touch panel 150 is a coordinate detection unit capable of detecting the position of the operational input to the top panel 120 made by the user, which may be, for example, a capacitive or resistive coordinate detection unit. Here, a mode in which the touch panel 150 is a capacitive coordinate detection unit will be described. The capacitive touch panel 150 can detect operational input to the top panel 120 even if there is a gap between the touch panel 150 and the top panel 120.

In addition, although a mode in which the top panel 120 is disposed on the input surface side of the touch panel 150 will be described here, the top panel 120 may be integrated with the touch panel 150. In that case, the surface of the touch panel 150 serves as the surface of the top panel 120 illustrated in FIGS. 2 and 3, which constitutes an operation surface. Furthermore, the top panel 120 illustrated in FIGS. 2 and 3 may be omitted in the configuration. In that case as well, the surface of the touch panel 150 constitutes an operation surface. In addition, in that case, it is sufficient if the member having the operation surface is vibrated by the natural vibration of the member.

Furthermore, in a case where the touch panel 150 is resistive, the touch panel 150 may be disposed on the top panel 120. In that case as well, the surface of the touch panel 150 constitutes an operation surface. Furthermore, the top panel 120 illustrated in FIGS. 2 and 3 may be omitted in the configuration. In that case as well, the surface of the touch panel 150 constitutes an operation surface. In addition, in that case, it is sufficient if the member having the operation surface is vibrated by the natural vibration of the member.

The display panel 160 only needs to be a display panel capable of displaying an image, such as a liquid crystal display panel and an organic electroluminescence (EL) panel, for example. The display panel 160 is disposed on the substrate 170 (Z-axis positive direction side) using a holder or the like (not illustrated) inside the recess 110A of the housing 110.

The display panel 160 is driven and controlled by a driver integrated circuit (IC) to be described later, and displays the GUI operation unit, an image, a character, a symbol, a figure, and the like depending on the operation status of the electronic device 100.

The substrate 170 is disposed inside the recess 110A of the housing 110. The display panel 160 and the touch panel 150 are disposed on the substrate 170. The display panel 160 and the touch panel 150 are fixed to the substrate 170 and the housing 110 by a holder or the like (not illustrated).

In addition to the drive controller to be described later, various circuits and the like necessary to drive the electronic device 100 are mounted on the substrate 170.

In the electronic device 100 having a configuration as described above, when the user touches the top panel 120 with his/her finger and movement of the fingertip is detected, the drive control unit mounted on the substrate 170 drives the vibrating element 140, and vibrates the top panel 120 at the frequency in the ultrasonic band. The frequency in the ultrasonic band is a resonant frequency of a resonance system including the top panel 120 and the vibrating element 140, which generates standing waves in the top panel 120.

By generating standing waves in the ultrasonic band, the electronic device 100 provides tactile sensation to the user through the top panel 120.

Figure 4A:
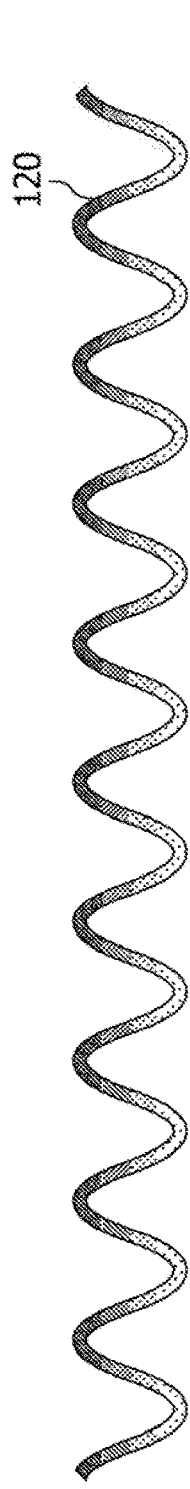
FIGS. 4A and 4B are views illustrating a wave head formed in parallel to the short side of a top panel among standing waves generated in the top panel by natural vibration in the ultrasonic band.
Figure 4B:
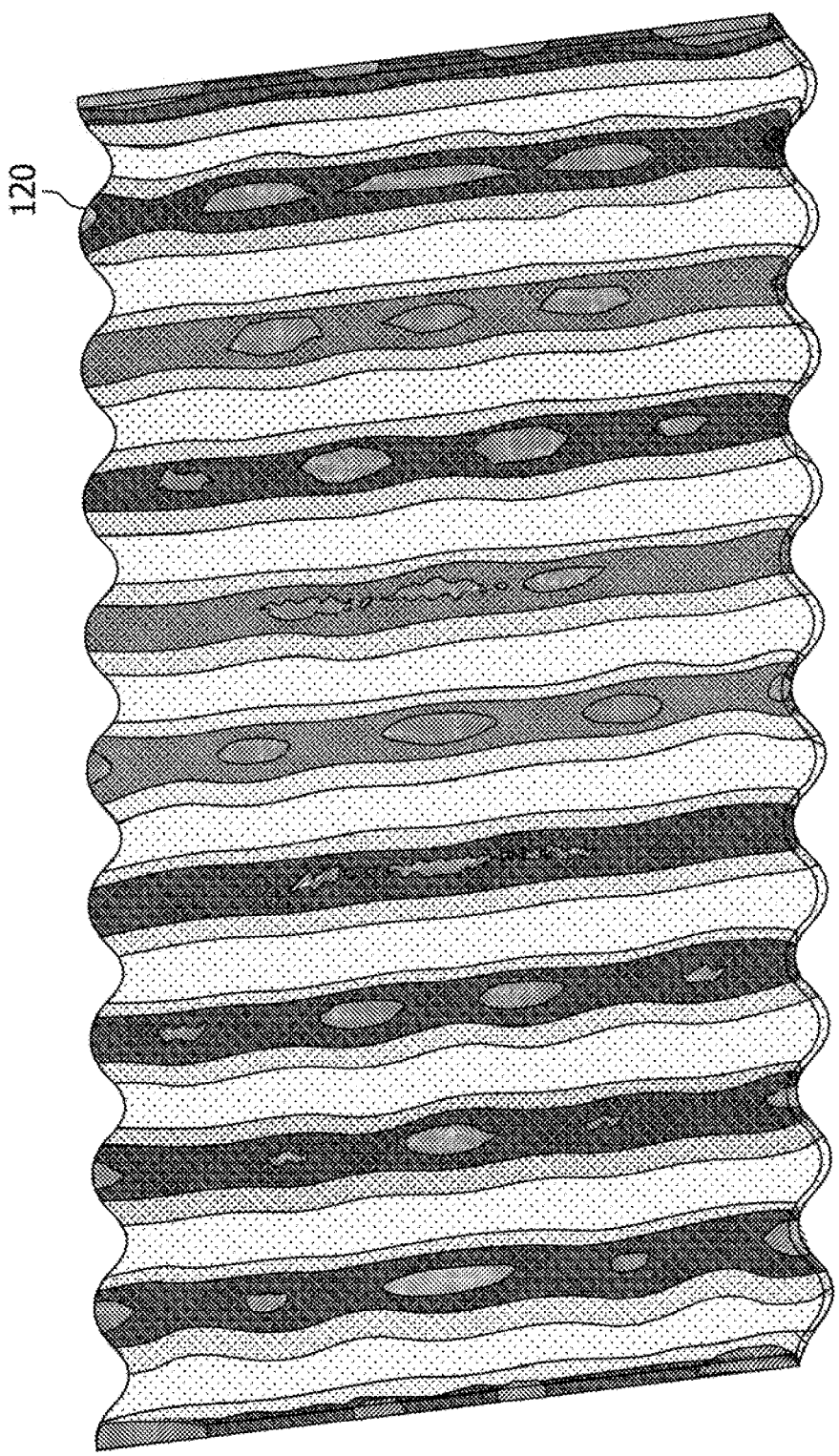

Next, the standing waves to be generated in the top panel 120 will be described with reference to FIGS. 4A and 4B. FIGS. 4A and 4B are views illustrating a wave head formed in parallel to the short side of the top panel 120 among the standing waves generated in the top panel 120 by natural vibration in the ultrasonic band. FIG. 4A is a side view, and FIG. 4B is a perspective view. In FIGS. 4A and 4B, XYZ coordinates similar to those in FIGS. 2 and 3 are defined. Note that FIGS. 4A and 4B illustrate the amplitude of the standing waves in an exaggerated manner for easy understanding. In addition, the vibrating element 140 is omitted in FIGS. 4A and 4B.

A natural frequency (resonant frequency) f of the top panel 120 is expressed by the following formulae (1) and (2) using Young's modulus E, density ρ, a Poisson's ratio δ, a long side dimension I, and a thickness t of the top panel 120, and the number of cycles k of the standing waves existing in the long side direction. Since the standing wave has the same waveform in units of ½ cycle, the number of cycles k takes values in increments of 0.5, which is 0.5, 1, 1.5, 2, and so on.

$$f = \frac{\pi k^2 t}{l^2} \sqrt{\frac{E}{3\rho(1-\delta^2)}} \quad (1)$$

$$f = \alpha k^2 \quad (2)$$

Note that a coefficient α in the formula (2) is a summary of coefficients other than $k^2$ in the formula (1).

For example, the standing waves illustrated in FIGS. 4A and 4B are waveforms in the case where the number of cycles k is 10. In a case where Gorilla (registered trademark) glass having a long side length L of 140 mm, a short side length of 80 mm, and the thickness t of 0.7 mm is used as the top panel 120, for example, the natural frequency f is 33.5 kHz when the number of cycles k is 10. In that case, it is sufficient if the drive signals having a frequency of 33.5 kHz are used.

The top panel 120 is a tabular member, and when the vibrating element 140 (see FIGS. 2 and 3) is driven to generate the natural vibration in the ultrasonic band, it is bended as illustrated in FIGS. 4A and 4B, thereby generating standing waves of bending vibration.

Note that, although a mode in which one vibrating element 140 is bonded along the short side extending in the X-axis direction on the Y-axis positive direction side on the surface on the Z-axis negative direction side of the top panel 120 is described here, two vibrating elements 140 may be used. In a case where two vibrating elements 140 are used, it is sufficient if the other one of the vibrating elements 140 is bonded along the short side extending in the X-axis direction on the Y-axis negative direction side on the surface on the Z-axis negative direction side of the top panel 120. In that case, it is sufficient if the two vibrating elements 140 are disposed to be axially symmetric with a center line parallel to the two short sides of the top panel 120 serving as a symmetry axis.

Furthermore, in a case where the two vibrating elements 140 are driven, when the number of cycles k is an integer, it is sufficient to be driven in the same phase as it is in a symmetric mode, and when the number of cycles k is a decimal (number including an integer part and a decimal part of 0.5), it is sufficient to be driven in the opposite phase since it is an antisymmetric mode.

Figure 5A:
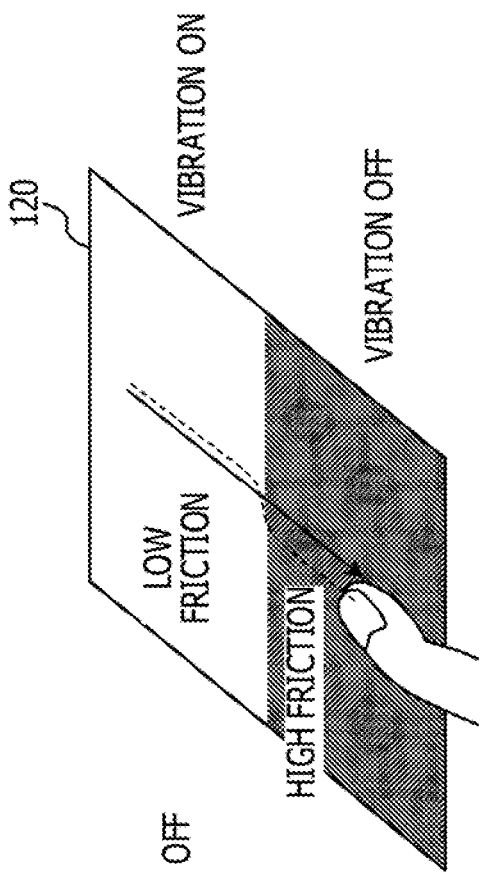
FIGS. 5A and 5B are diagrams illustrating a state in which dynamic friction force applied to a fingertip performing operational input changes due to the natural vibration in the ultrasonic band generated in the top panel of the electronic device.
Figure 5B:
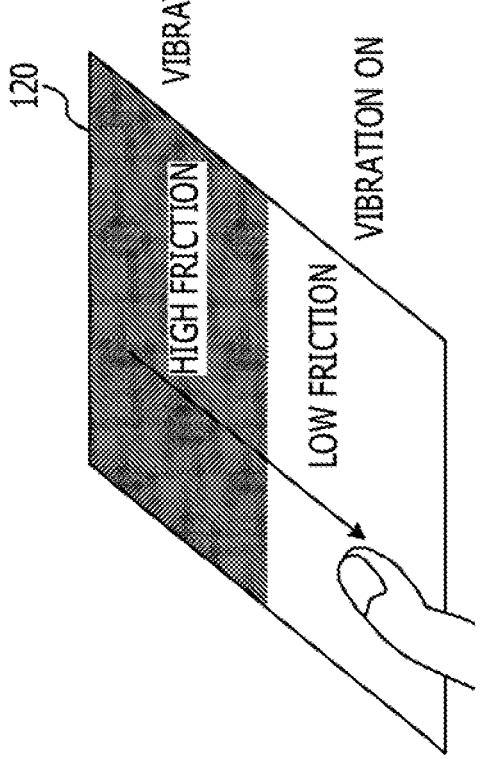

FIGS. 5A and 5B are diagrams illustrating a state in which dynamic friction force applied to a fingertip performing operational input changes due to the natural vibration in the ultrasonic band generated in the top panel 120 of the electronic device 100. In FIGS. 5A and 5B, the user is performing, while touching the top panel 120 with his/her fingertip, operational input of moving the finger along the arrow from the back side to the front side of the top panel 120. Note that the vibration is turned on/off by the vibrating element 140 (see FIGS. 2 and 3) being turned on/off.

Furthermore, in FIGS. 5A and 5B, the range touched by the finger while the vibration is off is illustrated in gray, and the range touched by the finger while the vibration is on is illustrated in white in the depth direction of the top panel 120.

While the natural vibration in the ultrasonic band is generated in the entire top panel 120 as illustrated in FIGS. 4A, 4B, 5A and 5B illustrate operation pattern of switching on/off of the vibration while the user's finger moves from the back side to the front side of the top panel 120.

Accordingly, in FIGS. 5A and 5B, the range touched by the finger while the vibration is off is illustrated in gray, and the range touched by the finger while the vibration is on is illustrated in white in the depth direction of the top panel 120.

In the operation pattern illustrated in FIG. 5A, the vibration is off when the user's finger is on the back side of the top panel 120, and the vibration is turned on while the finger moves to the front side.

On the other hand, in the operation pattern illustrated in FIG. 5B, the vibration is on when the user's finger is on the back side of the top panel 120, and the vibration is turned off while the finger moves to the front side.

Here, when the natural vibration in the ultrasonic band is generated in the top panel 120, an air layer based on the squeeze effect is interposed between the surface of the top panel 120 and the finger, and a dynamic friction coefficient at the time when the surface of the top panel 120 is traced with the finger decreases.

Accordingly, in FIG. 5A, the dynamic friction force applied to the fingertip is large in the range illustrated in gray on the back side of the top panel 120, and the dynamic friction force applied to the fingertip is small in the range illustrated in white on the front side of the top panel 120.

Accordingly, as illustrated in FIG. 5A, the user who performs operational input to the top panel 120 senses a decrease in dynamic friction force applied to the fingertip when the vibration is turned on, and perceives the ease of slipping of the fingertip. At this time, with the surface of the top panel 120 being smoother, the user feels that a recess exists on the surface of the top panel 120 when the dynamic friction force decreases.

On the other hand, in FIG. 5B, the dynamic friction force applied to the fingertip is small in the range illustrated in white on the back front side of the top panel 120, and the dynamic friction force applied to the fingertip is large in the range illustrated in gray on the front side of the top panel 120.

Accordingly, as illustrated in FIG. 5B, the user who performs operational input to the top panel 120 senses an increase in dynamic friction force applied to the fingertip when the vibration is turned off, and perceives a hard-to-slip sense of the fingertip or the feeling of being caught. Then, since the fingertip becomes less slippery, it feels as if a projection exists on the surface of the top panel 120 when the dynamic friction force increases.

As described above, the user can feel the unevenness with the fingertip in the case of FIGS. 5A and 5B. The fact that a person perceives the unevenness in this manner is disclosed in, for example, "Print Transfer Method for Tactile Design and Sticky-band Illusion" (Papers of 11th Annual Conference of the Society of Instrument and Control Engineers (SICE) System Integration Division (SI2010, Sendai), 174-177, 2010-12). It is also disclosed in "Fishbone Tactile Illusion" (Papers of 10th Annual Conference of the Virtual Reality Society of Japan (VRSJ) (September 2005)).

Note that, although the change in dynamic friction force in the case where on/off of the vibration is switched has been described here, the same applies to the case where the amplitude (intensity) of the vibrating element 140 is changed.

Figure 6:
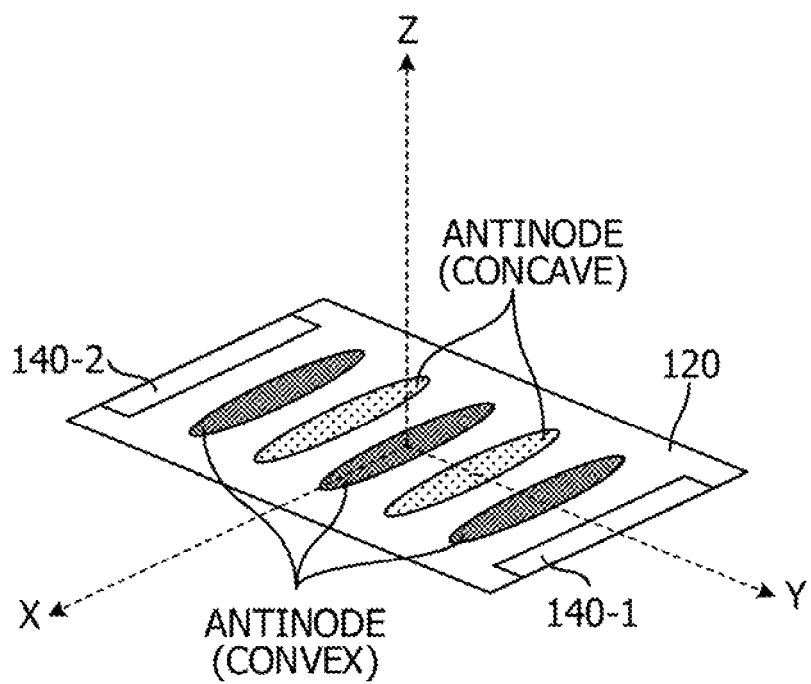
FIG. 6 is a diagram illustrating standing waves generated in the top panel.

Next, standing waves to be generated in the top panel 120 will be described with reference to FIG. 6. FIG. 6 is a diagram illustrating the standing waves generated in the top panel 120. In FIG. 6, the XYZ coordinates similar to those in FIGS. 2 to 4B are defined.

The top panel 120 is provided with vibrating elements 140-1 and 140-2. The vibrating element 140-1 is similar to the vibrating element 140 illustrated in FIGS. 2 and 3, and the vibrating element 140-2 is disposed along the X-axis at the end of the top panel 120 on the Y-axis negative direction side. In other words, the vibrating element 140-2 is disposed along the opposite side of the side of the top panel 120 at which the vibrating element 140-1 is disposed.

Here, it is assumed that the vibrating elements 140-1 and 140-2 are driven in the same phase, and convex antinodes illustrated in dark gray and concave antinodes illustrated in light gray are generated on the top panel 120 at a certain timing. The convex antinodes illustrated in dark gray and the concave antinodes illustrated in light gray are those at the maximum amplitude.

Note that, at a timing different from the timing illustrated in FIG. 6 by a half cycle of the natural vibration of the standing wave, concave antinodes at the maximum amplitude are generated at the portions of the convex antinodes illustrated in dark gray in FIG. 6, and convex amplitudes at the maximum amplitude are generated at the portions of the concave antinodes illustrated in light gray in FIG. 6.

Figure 7:
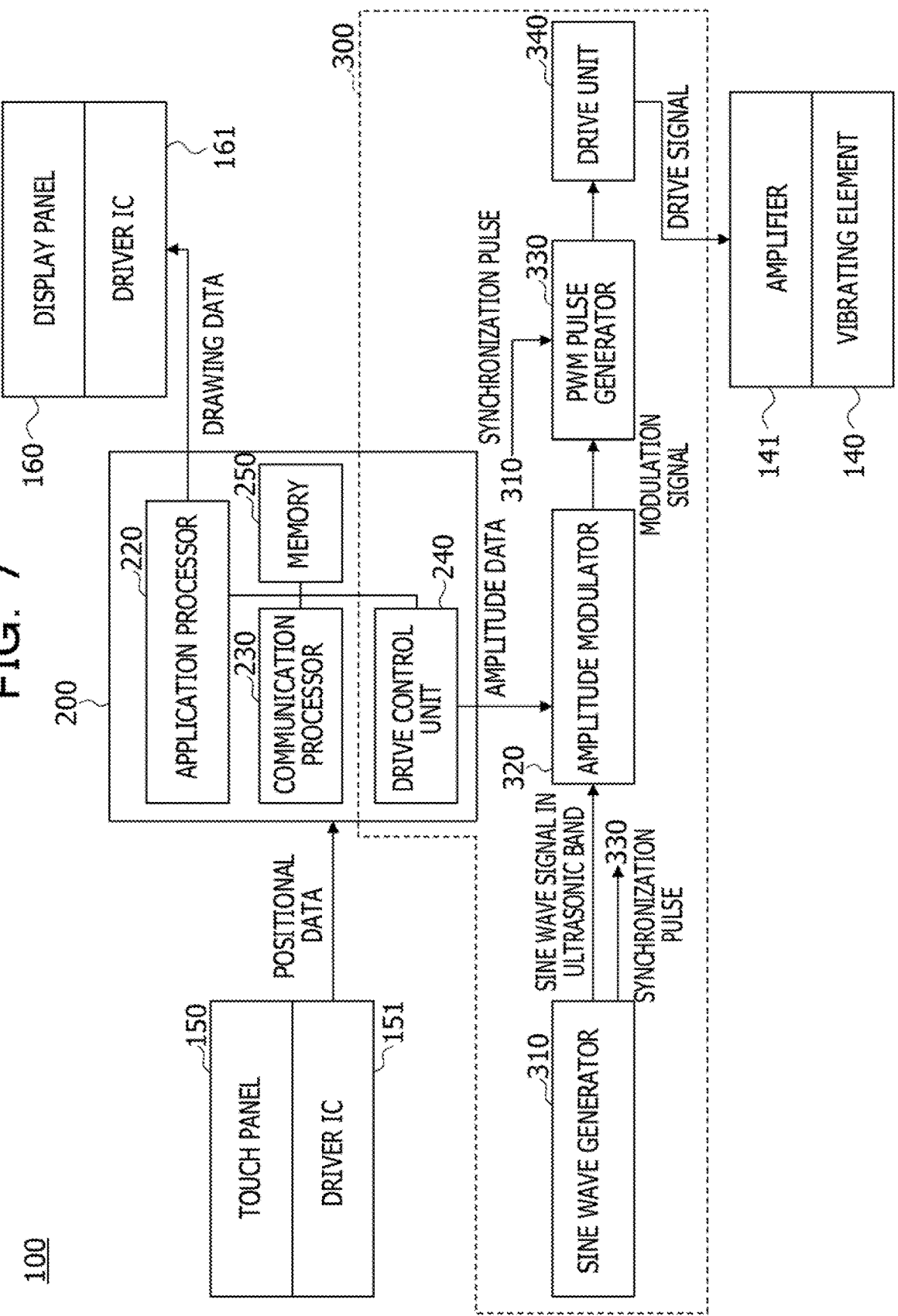
FIG. 7 is a diagram illustrating a configuration of the electronic device according to an embodiment.

Next, a configuration of the electronic device 100 according to the embodiment will be described with reference to FIG. 7. FIG. 7 is a diagram illustrating a configuration of the electronic device 100 according to an embodiment.

The electronic device 100 includes the vibrating element 140, an amplifier 141, the touch panel 150, a driver integrated circuit (IC) 151, the display panel 160, a driver IC 161, a control unit 200, a sine wave generator 310, an amplitude modulator 320, a pulse width modulated (PWM) pulse generator 330, and a drive unit 340. Here, the sine wave generator 310, the amplitude modulator 320, and the PWM pulse generator 330 are examples of a pulse generator.

The control unit 200 includes an application processor 220, a communication processor 230, a drive control unit 240, and a memory 250. The control unit 200 is implemented by, for example, an IC chip.

Furthermore, the drive control unit 240, the sine wave generator 310, the amplitude modulator 320, the PWM pulse generator 330, and the drive unit 340 constitute a drive controller 300. Note that, although a mode in which the application processor 220, the communication processor 230, the drive control unit 240, and the memory 250 are implemented by one control unit 200 will be described here, the drive control unit 240 may be separately provided outside the control unit 200 as another IC chip or a processor. In that case, it is sufficient if, among data stored in the memory 250, data necessary for the drive control of the drive control unit 240 is stored in a memory different from the memory 250 and provided inside the drive controller 300.

Figure 8:
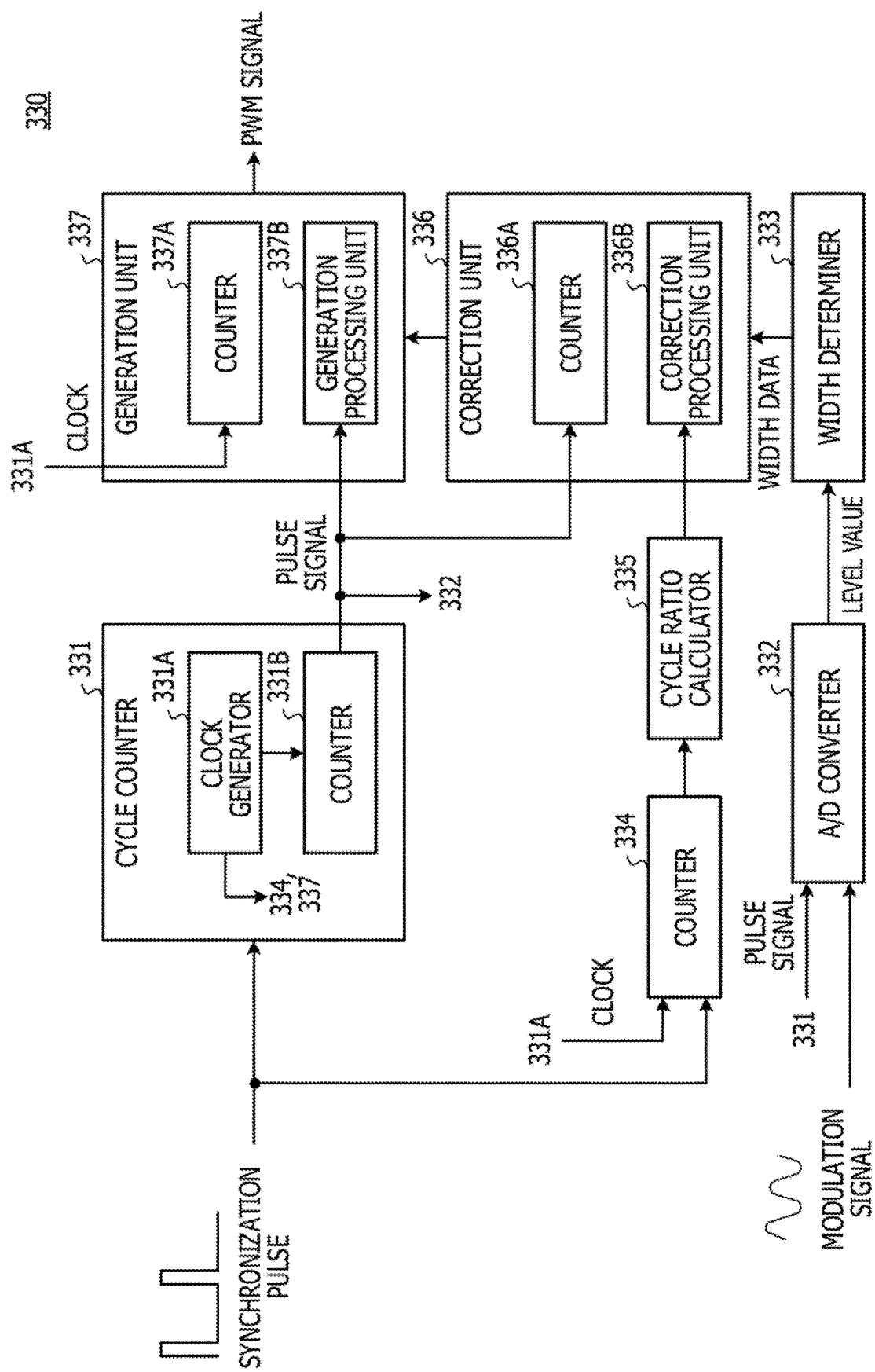
FIG. 8 is a diagram illustrating a configuration of a pulse generator.
Figure 9:
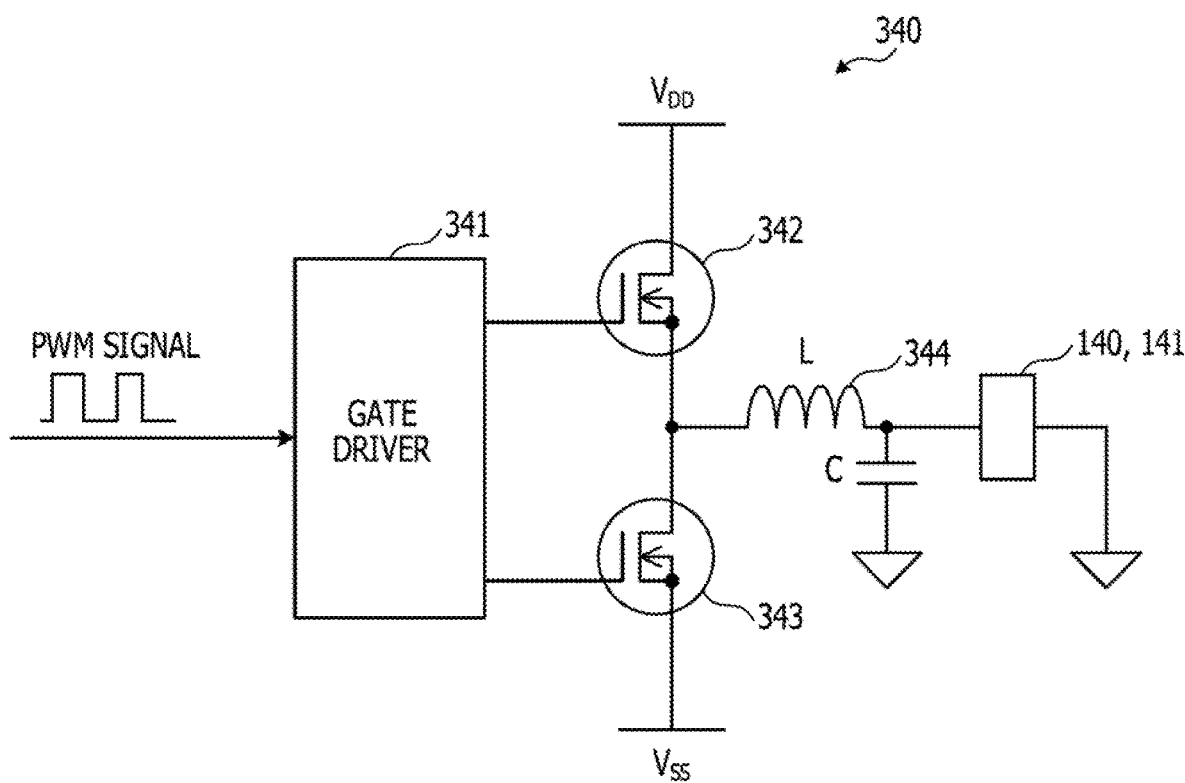
FIG. 9 is a diagram illustrating a configuration of a drive unit.

In FIG. 7, the housing 110, the top panel 120, the double-sided tape 130, and the substrate 170 (see FIG. 2) are omitted. Furthermore, the amplifier 141, the driver IC 151, the driver IC 161, the drive control unit 240, the memory 250, the sine wave generator 310, the amplitude modulator 320, the PWM pulse generator 330, and the drive unit 340 will be described here. Furthermore, the PWM pulse generator 330 and the drive unit 340 will be described with reference to FIGS. 8 and 9 in addition to FIG. 7. FIG. 8 is a diagram illustrating a configuration of the PWM pulse generator 330. FIG. 9 is a diagram illustrating a configuration of the drive unit 340.

The amplifier 141 is disposed between the drive controller 300 and the vibrating element 140, and amplifies the drive signals output from the drive controller 300 to drive the vibrating element 140.

The driver IC 151 is connected to the touch panel 150, detects positional data indicating a position at which operational input to the touch panel 150 has been made, and outputs the positional data to the control unit 200. As a result, the positional data is input to the application processor 220 and the drive control unit 240. Note that inputting positional data to the drive control unit 240 is equivalent to inputting positional data to the drive controller 300.

The driver IC 161 is connected to the display panel 160, inputs drawing data output from the drive controller 300 to the display panel 160, and causes the display panel 160 to display an image based on the drawing data. Accordingly, the GUI operation unit, an image based on the drawing data, or the like is displayed on the display panel 160.

The application processor 220 performs a process of executing various applications of the electronic device 100.

The communication processor 230 executes a process necessary for the electronic device 100 to perform communication, such as 3rd generation (3G), 4th generation (4G), long term evolution (LTE), and Wi-Fi.

In a case where two predetermined conditions are satisfied, the drive control unit 240 outputs amplitude data to the amplitude modulator 320. The amplitude data is data indicating an amplitude value for adjusting the intensity of the drive signals used to drive the vibrating element 140. The amplitude value is set according to a degree of temporal changes in the positional data. Here, as the degree of temporal changes in the positional data, a speed at which the user's fingertip moves along the surface of the top panel 120 is used. The moving speed of the user's fingertip is calculated by the drive control unit 240 on the basis of the degree of temporal changes in the positional data input from the driver IC 151.

Furthermore, the drive controller 300 according to the embodiment vibrates the top panel 120 to change the dynamic friction force applied to the user's fingertip when the fingertip moves along the surface of the top panel 120. Since the dynamic friction force is generated while the fingertip is moving, the drive control unit 240 vibrates the vibrating element 140 when the moving speed becomes equal to or higher than a predetermined threshold speed. It is the first predetermined condition that the moving speed becomes equal to or higher than the predetermined threshold speed.

Therefore, the amplitude value indicated by the amplitude data output from the drive control unit 240 is zero when the moving speed is less than the predetermined threshold speed, and when the moving speed becomes equal to or higher than the predetermined threshold speed, predetermined amplitude value is set according to the moving speed. When the moving speed is equal to or higher than the predetermined threshold speed, the amplitude value is set to be smaller as the moving speed is higher, and the amplitude value is set to be larger as the moving speed is lower.

Furthermore, in a case where the position of the fingertip that performs operational input is within a predetermined area where vibration is to be generated, the drive controller 300 according to the embodiment outputs the amplitude data to the amplitude modulator 320. It is the second predetermined condition that the position of the fingertip that performs operational input is within the predetermined area where the vibration is to be generated.

It is determined whether the position of the fingertip that performs operational input is within the predetermined area where the vibration is to be generated on the basis of whether or not the position of the fingertip that performs operational input is inside the predetermined area where the vibration is to be generated.

Here, the position on the display panel 160, such as the GUI operation unit to be displayed on the display panel 160, an area for displaying an image, and an area representing the entire page, is specified by area data indicating the area. The area data exists for all GUI operation units displayed on the display panel 160, areas for displaying an image, or areas representing the entire page in all applications.

Therefore, when it is determined whether the position of the fingertip that performs operational input is within the predetermined area where the vibration is to be generated as the second predetermined condition, a type of the application being activated by the electronic device 100 has relations. This is because the display on the display panel 160 differs depending on the type of application.

In addition, it is because a type of operational input of moving the fingertip touching the surface of the top panel 120 differs depending on the type of application. As a type of operational input of moving the fingertip touching the surface of the top panel 120, for example, there is what is called flick operation when the GUI operation unit is operated. The flick operation is operation of moving the fingertip along the surface of the top panel 120 for a relatively short distance in a manner of flicking (snapping) the surface.

Furthermore, in a case of page turning, swipe operation is performed, for example. The swipe operation is operation of moving the fingertip along the surface of the top panel 120 for a relatively long distance in a manner of sweeping the surface. The swipe operation is performed in a case of turning a photo, for example, in addition to the page turning. Furthermore, in a case where a slider (see the slider 102B in FIG. 1) is slid by the GUI operation unit, drag operation of dragging the slider is performed.

The operational input of moving the fingertip touching the surface of the top panel 120, such as the flick operation, the swipe operation, and the drag operation given as examples here, is selectively used depending on the type of display based on the application. Therefore, when it is determined whether the position of the fingertip that performs operational input is within the predetermined area where the vibration is to be generated, the type of the application being activated by the electronic device 100 has relations.

The drive control unit 240 determines, using the area data, whether or not the position indicated by the positional data input from the driver IC 151 is inside the predetermined area where the vibration is to be generated.

Data in which data indicating a type of the application, area data indicating the GUI operation unit or the like on which operational input is made, and pattern data indicating a vibration pattern are associated with each other is stored in the memory 250.

The memory 250 stores the data in which data indicating a type of the application, area data indicating the GUI operation unit or the like on which operational input is made, and pattern data indicating a vibration pattern are associated with each other.

Furthermore, the memory 250 stores data and programs necessary for the application processor 220 to execute an application, data and programs necessary for the communication processor 230 to perform communication processing, and the like.

The sine wave generator 310 generates a sine wave necessary for generating drive signals for causing the top panel 120 to vibrate at the natural frequency, and a synchronization pulse indicating a rising timing of the sine wave. For example, in a case where the top panel 120 is caused to vibrate at the natural frequency f of 33.5 kHz, the frequency of the sine wave is 33.5 kHz. The sine wave generator 310 inputs sine wave signals in the ultrasonic band to the amplitude modulator 320.

The sine wave signals generated by the sine wave generator 310 are alternating reference signals to be a basis of the drive signals for generating the natural vibration in the ultrasonic band, and has a constant frequency and a constant phase. The sine wave generator 310 inputs sine wave signals in the ultrasonic band to the amplitude modulator 320.

Furthermore, the sine wave generator 310 inputs a synchronization pulse to the PWM pulse generator 330. The synchronization pulse is pulse signals indicating a rising timing of the sine wave, and is output from the sine wave generator 310 each time the sine wave rises each cycle. As an example, in a case where the frequency of the sine wave is 33.5 kHz, the frequency of the synchronization pulse is also 33.5 kHz. The synchronization pulse becomes a high (H) level for a predetermined short period of time at the rising timing of the sine wave.

Note that, although a mode in which the sine wave generator 310 that generates sine wave signals is used will be described here, the signals may not be the sine wave signals. For example, a signal having a waveform in which the rising and falling waveforms of the clock are blunted may be used. Therefore, a signal generator that generates alternating-current signals in the ultrasonic band may be used instead of the sine wave generator 310.

The amplitude modulator 320 modulates, using the amplitude data input from the drive control unit 240, the amplitude of the sine wave signals input from the sine wave generator 310 to generate modulation signals. The modulation signals are signals to be a basis of the drive signals ultimately supplied to the vibrating element 140. The amplitude modulator 320 outputs the modulation signals to the PWM pulse generator 330. The amplitude modulator 320 modulates only the amplitude of the sine wave signals in the ultrasonic band input from the sine wave generator 310, and generates modulation signals without modulating the frequency and the phase.

Therefore, the modulation signals output from the amplitude modulator 320 are sine wave signals in the ultrasonic band obtained by modulating only the amplitude of the sine wave signals in the ultrasonic band input from the sine wave generator 310. Note that the amplitude of the modulation signals is zero in the case where the amplitude data is zero. This is equivalent to the state in which the amplitude modulator 320 does not output modulation signals.

The PWM pulse generator 330 is provided between the amplitude modulator 320 and the drive unit 340. The PWM pulse generator 330 generates pulse width modulated (PWM) signals on the basis of the modulation signals input from the amplitude modulator 320 and the synchronization pulse input from the sine wave generator 310.

As illustrated in FIG. 8, the PWM pulse generator 330 includes a cycle counter 331, an analog to digital (A/D) converter 332, a width determiner 333, a counter 334, a cycle ratio calculator 335, a correction unit 336, and a generation unit 337.

The PWM pulse generator 330 receives the synchronization pulse from the sine wave generator 310 (see FIG. 7), and receives the modulation signals from the amplitude modulator 320. The synchronization pulse is input to the cycle counter 331 and the counter 334, and the modulation signals are input to the A/D converter 332.

The cycle counter 331 includes a clock generator 331A and a counter 331B. The clock generator 331A outputs a clock having a frequency higher than that of the synchronization pulse to the counter 331B, the counter 334, and the generation unit 337. The frequency of the clock output from the clock generator 331A is preferably more than hundreds of times higher than the frequency of the synchronization pulse, for example. The clock generator 331A is implemented by, for example, a clock generator.

The counter 331B counts the number of clocks output from the clock generator 331A. The counter 331B is implemented by, for example, a combinational circuit. When a predetermined count value has been counted, the counter 331B outputs pulse signals and returns the count value to zero. The counter 331B repeatedly counts the predetermined count value, and outputs pulse signals each time it finishes counting the predetermined count value. The pulse signals here are exemplary first pulse signals.

Furthermore, in a case where a synchronization pulse is input while counting the number of clocks output from the clock generator 331A, the counter 331B resets the count value and outputs pulse signals. The pulse signals here are exemplary second pulse signals. The counter 331B starts counting again when the count value is reset.

The counter 331B resets the count value on the basis of the synchronization pulse before the count value reaches a predetermined count value. The predetermined count value is, for example, 50. That is, the counter 331B counts the number of clocks output from the clock generator 331A, and outputs pulse signals when the count number reaches 50.

Furthermore, in a case where a synchronization pulse is input while counting the number of clocks output from the clock generator 331A, the counter 331B resets the count value less than 50 and outputs pulse signals.

The pulse signals output from the counter 331B as described above are input to the A/D converter 332 and the generation unit 337 as output of the cycle counter 331.

The A/D converter 332 digitally converts the modulation signals according to the pulse signals output from the counter 331B of the cycle counter 331, and outputs a digital value (level value) indicating the signal level of the modulation signals. The A/D converter 332 outputs, to the width determiner 333, the level value indicating the signal level of the modulation signals at the time when pulse signals are input. Therefore, the A/D converter 332 outputs the level value to the width determiner 333 each time pulse signals are input.

The width determiner 333 determines, on the basis of the level value input from the A/D converter 332, a width of an H level section in the case where modulation signals are converted into PWM signals, and outputs width data indicating a width to the correction unit 336. The width data indicates the width of the H level section in the case where modulation signals are converted into PWM signals, and a cycle of the PWM signals is a period between two consecutive pulse signals, whereby obtaining the width data is equivalent to obtaining a duty ratio in the case where the modulation signals are converted into the PWM signals. The width determiner 333 is implemented by, for example, a microcomputer, a central processing unit (CPU), or a field programmable gate array (FPGA). The width determiner 333 may be included in an IC chip that implements the control unit 200. Note that a method of obtaining the width data will be described later.

The counter 334 counts the number of clocks input from the clock generator 331A. The counter 334 is implemented by, for example, a combinational circuit. The counter 334 resets the count value when the synchronization pulse is input, and outputs the count value until the next synchronization pulse is input to the cycle ratio calculator 335. Accordingly, the count value output from the counter 334 is a value obtained by counting the number of clocks input from the clock generator 331A during the period of one cycle of the sine wave signal generated by the sine wave generator 310.

The cycle ratio calculator 335 retains data indicating a predetermined count value counted by the counter 331B, and calculates a value N obtained by dividing the count value input from the counter 334 by the predetermined count value and a value M representing the remainder. As described above, the predetermined count value is, for example, 50. Here, the predetermined count value is represented by C.

Furthermore, the cycle ratio calculator 335 calculates a ratio α (=M/C) by dividing the value M by the predetermined count value C. The cycle ratio calculator 335 outputs data indicating the value N, the value M, and the ratio α to the correction unit 336. The cycle ratio calculator 335 is implemented by, for example, a microcomputer or a CPU. The cycle ratio calculator 335 may be included in the IC chip that implements the control unit 200.

The correction unit 336 includes a counter 336A, and a correction processing unit 336B. Pulse signals are input to the counter 336A from the cycle counter 331. The correction processing unit 336B receives the width data from the width determiner 333, and the data indicating the value N, the value M, and the ratio α from the cycle ratio calculator 335.

The counter 336A counts the number of times the pulse signals are input from the cycle counter 331. The counter 336A is implemented by, for example, a combinational circuit. The count value of the counter 336A is reset by the correction processing unit 336B when it becomes N+1.

The correction processing unit 336B corrects the width data input from the width determiner 333. The width data is generated by the width determiner 333 on the basis of the level value output from the A/D converter 332 according to the pulse signals, and is input to the correction processing unit 336B. Accordingly, the width data is input to the correction processing unit 336B according to the pulse signals.

The correction processing unit 336B outputs, to the generation unit 337, the width data input from the width determiner 333 with the number of times the pulse signals counted by the counter 336A are input from the first time to the N-th time as it is without making correction. The number N in the N-th time indicates the value N calculated by the cycle ratio calculator 335.

The correction processing unit 336B corrects the width data by multiplying the width data input from the width determiner 333 by the ratio α when the number of times the pulse signals are input is N+1, and outputs the corrected width data to the generation unit 337.

Since the data indicating the value N is input to the correction processing unit 336B from the cycle ratio calculator 335, the correction processing unit 336B corrects the width data by multiplying the width data by the ratio α when the count value of the counter 336A becomes N+1.

Furthermore, the correction processing unit 336B resets the counter 336A when the count value of the counter 336A becomes N+1. The correction processing unit 336B is implemented by, for example, a microcomputer or a CPU. The correction processing unit 336B may be included in the IC chip that implements the control unit 200.

The generation unit 337 includes a counter 337A and a generation processing unit 337B, and generates PWM signals. The generation unit 337 receives a clock from the clock generator 331A, receives pulse signals from the counter 331B, and receives width data from the correction unit 336.

The counter 337A counts the clocks input from the clock generator 331A. The counter 337 is implemented by, for example, a combinational circuit.

The generation processing unit 337B outputs PWM signals. When the pulse signals are input from the counter 331B of the cycle counter 331, the generation processing unit 337B outputs an H level. Furthermore, when the count value of the counter 337A reaches the value indicated by the width data input from the correction unit 336, the generation processing unit 337B switches the output to an L level. The generation processing unit 337B switches the output to the L level when the count value of the counter 337A exceeds the value indicated by the width data. The generation processing unit 337B is implemented by, for example, a digital IC.

In this manner, the generation unit 337 generates the PWM signals having the H level width section indicated by the width data, and outputs them to the amplifier 141 (see FIG. 7).

The drive unit 340 is provided between the PWM pulse generator 330 and the amplifier 141. The drive unit 340 includes a gate driver 341, metal oxide semiconductor field effect transistors (MOSFETs) 342 and 343, and a low-pass filter 344. The drive unit 340 generates drive signals on the basis of the PWM signals input from the PWM pulse generator 330, and outputs them to the amplifier 141.

The gate driver 341 is a drive circuit that drives the MOSFETs 342 and 343, which is an exemplary switching element driver. The gate driver 341 is implemented by, for example, a gate driver IC.

The MOSFETs 342 and 343 are N-channel MOSFETs, which are examples of a high-side switching element and a low-side switching element, respectively. The MOSFET 342 has a drain connected to a power supply VDD, a source connected to a drain of the MOSFET 343, and a gate connected to the gate driver 341. The MOSFET 342 has a drain connected to a source of the MOSFET 342, a source connected to a reference potential point VSS, and a gate connected to the gate driver 341.

The low-pass filter 344 is provided between the junction point (midpoint) between the source of the MOSFET 343 and the drain of the MOSFET 343 and the vibrating element 140. The low-pass filter 344 includes an inductor L and a capacitor C.

Such a drive unit 340 generates sinusoidal drive signals on the basis of the PWM signals input from the PWM pulse generator 330, and outputs them to the amplifier 141.

Figure 10:
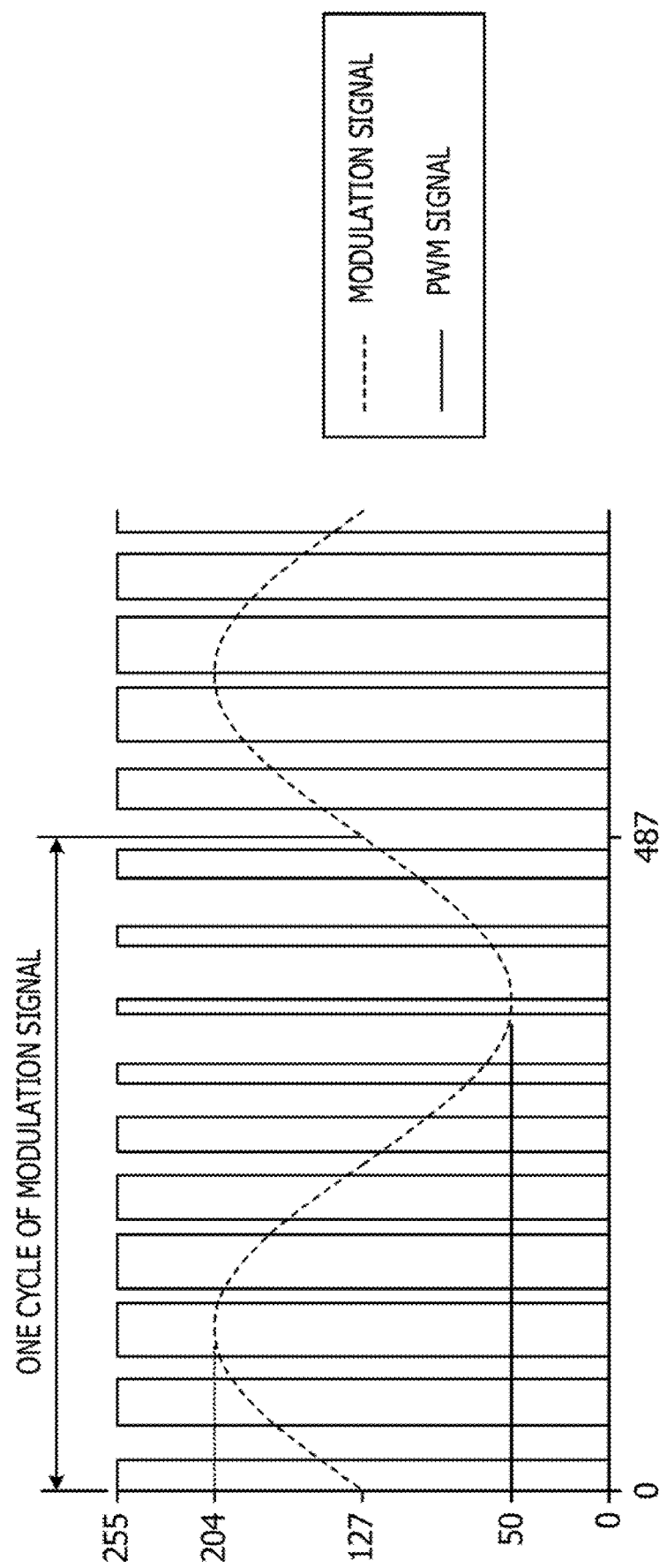
FIG. 10 is a diagram illustrating a modulation signal and a PWM signal for comparison.
Figure 11:
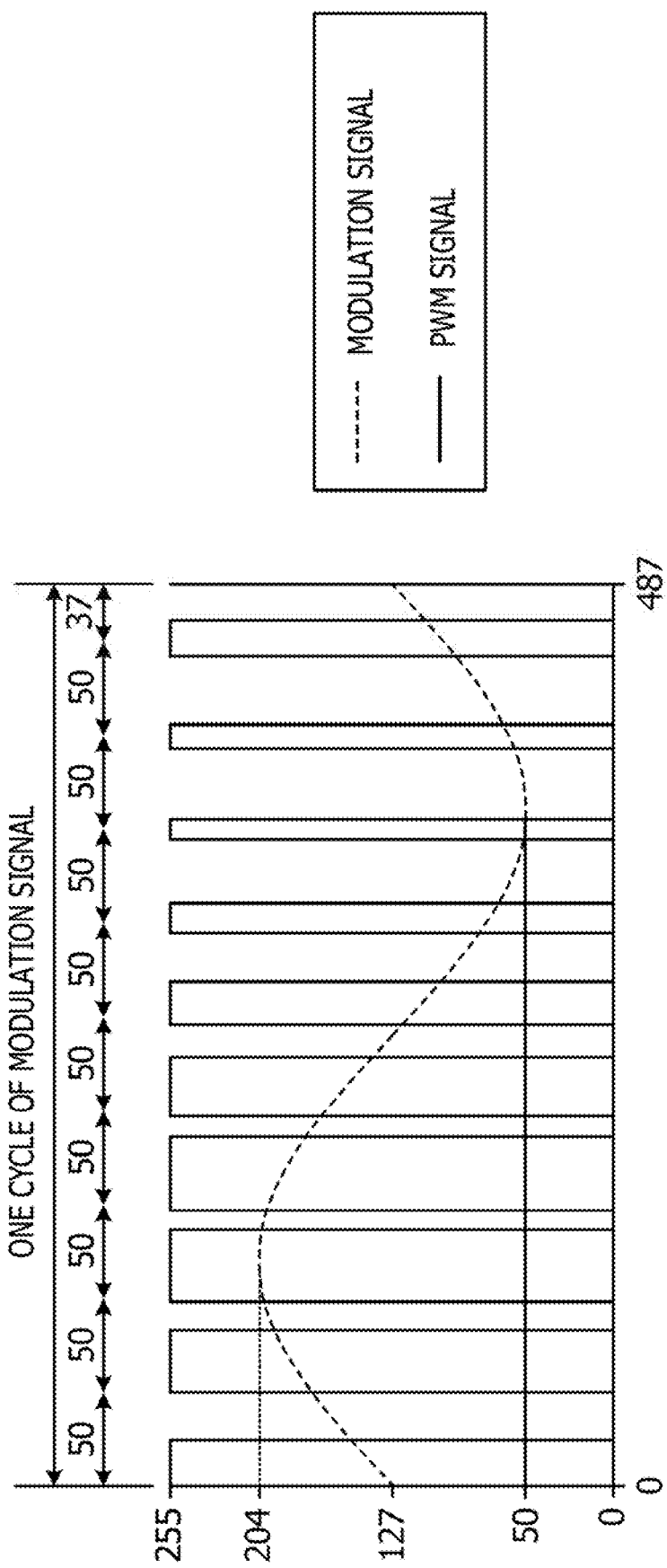
FIG. 11 is a diagram illustrating the modulation signal and the PWM signal.
Figure 12:
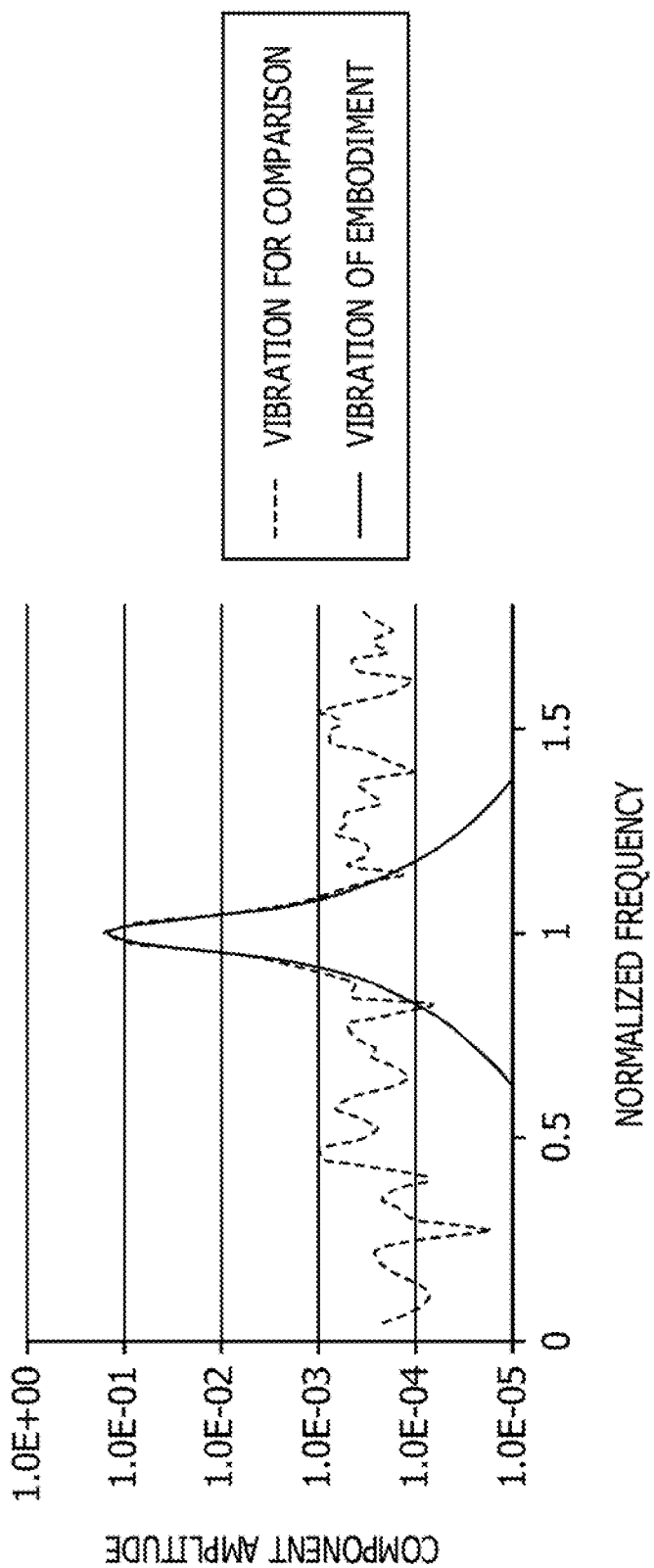
FIG. 12 is a diagram illustrating a frequency component of vibration generated in the top panel in the case where a vibrating element is driven using the PWM signal for comparison illustrated in FIG. 10 and in the case where a vibrating element is driven using the PWM signal illustrated in FIG. 11.

Next, a relationship between sinusoidal modulation signals and PWM signals will be described with reference to FIGS. 10 to 12. FIG. 10 is a diagram illustrating a waveform in the case where the PWM pulse generator 330 does not match the modulation signal with the cycle width of the PWM signal for comparison. FIG. 11 is a diagram illustrating a waveform in the case where the PWM pulse generator 330 matches the modulation signal with the cycle width of the PWM signal. FIG. 12 is a diagram illustrating a frequency component of the drive signal applied to the vibrating element 140 in the case where the vibrating element 140 is driven using the PWM signal for comparison illustrated in FIG. 10 and in the case where the vibrating element 140 is driven using the PWM signal illustrated in FIG. 11.

In FIGS. 10 and 11, the horizontal axis represents the elapsed time from the start of vibration of the modulation signals at the number of clocks generated by the clock generator 331A (see FIG. 8), and the vertical axis represents the signal level of the modulation signals.

As illustrated in FIGS. 10 and 11, the signal level of the modulation signals is expressed using 256 scales of values from 0 to 255 such that the vibration center is 127, the minimum value is 50, and the maximum value is 204. The signal level of the modulation signals expressed by 256 scales of values is expressed by a level value, and is output from the A/D converter 332.

The PWM signals indicating such a signal level of the modulation signals has a duty ratio of 50% when the signal level of the modulation signals is 127, a duty ratio of the minimum value (20%) when the signal level of the modulation signals is 50, and a duty ratio of the maximum value (80%) when the signal level of the modulation signals is 204.

Here, it is assumed that one cycle of the modulation signal is equivalent to 487 cycles of the clock generated by the clock generator 331A, as an example. This indicates that a period of one cycle of the modulation signal and a period of one cycle of a clock generated by the clock generator 331A are measured in advance, and it is found out that one cycle of the modulation signals is equivalent to 487 cycles of the clock.

In such a case, in the case where the PWM pulse generator 330 does not match the modulation signal and the cycle width of the PWM signal, a relationship between the modulation signal and the PWM signal for comparison is as illustrated in FIG. 10. The case where the PWM pulse generator 330 does not match the modulation signal and the cycle width of the PWM signal indicates a case where the cycle of the PWM signal is fixed, and in this case, all the cycles of the PWM signal for comparison are fixed to the period of 50 cycles of the clock generated by the clock generator 331A (see FIG. 8).

As illustrated in FIG. 10, while one cycle of the modulation signal is the period corresponding to 487 cycles of the clock, all the cycles of the PWM signal for comparison is the period of 50 cycles of the clock, whereby the time point at which one cycle of the modulation signal ends does not coincide with the time point at which 10th cycle of the PWM signal for comparison ends. In other words, the length of one cycle of the modulation signal does not coincide with the length of 10 cycles of the PWM signal for comparison. Moreover, in other words, one cycle of the modulation signal and 10 cycles of the PWM signal for comparison are not synchronized.

If the time point at which the cycle of the modulation signal ends does not coincide with the time point at which the cycle of the PWM signal for comparison ends in this manner, the time point at which the cycle of the modulation signal ends and the time point at which the cycle of the PWM signal for comparison ends continue to shift from each other. Furthermore, it has been found out that unusual noise occurs in the vibration of the top panel 120 in the case where the time point at which the cycle of the modulation signals ends does not coincide with the time point at which the cycle of the PWM signal for comparison ends.

Meanwhile, in FIG. 11, although the cycle of the PWM signal is the period corresponding to 50 cycles of the clock from the first to ninth cycles of the PWM signal, the cycle of the PWM signal becomes the period corresponding to 37 cycles of the clock at the 10th cycle of the PWM signal, whereby the time point at which one cycle of the modulation signals ends coincides with the time point at which the 10th cycle of the PWM signal ends. In other words, the length of one cycle of the modulation signal coincides with the length of 10 cycles of the PWM signal. Moreover, in other words, one cycle of the modulation signal and 10 cycles of the PWM signal are synchronized.

This is because the counter 331B (see FIG. 8) resets the count value by the synchronization pulse being input thereto at the time point when the count value reaches 37 in the 10th cycle of the PWM signal and the period of 37 clocks ends.

Therefore, in the drive controller 300, the time point at which one cycle of the modulation signal ends constantly coincides with the time point at which the 10th cycle of the PWM signal ends, whereby occurrence of unusual noise can be suppressed at the time of vibrating the top panel 120.

In view of the above, FIG. 12 illustrates comparison of a frequency component of the drive signals applied to the vibrating element 140 between the case where the vibrating element 140 is driven using the PWM signals for comparison and the case where the vibrating element 140 is driven using the PWM signals according to the embodiment.

In FIG. 12, the horizontal axis represents a frequency normalized by the natural frequency of the top panel 120. The natural frequency of the top panel 120 is, for example, 33.5 kHz. It is indicated that the frequency component having a horizontal axis value of 1 is the natural vibration with a frequency of 33.5 kHz. The vertical axis represents a signal component (value obtained by performing Fourier transformation on the amplitude of the drive signals) at each frequency. In FIG. 12, the characteristic indicated by a broken line represents a signal component for comparison that drives the vibrating element 140 using the PWM signals for comparison, and the characteristic indicated by a solid line represents a signal component that drives the vibrating element 140 using the PWM signals according to the embodiment.

As indicated by the broken line, it can be seen that, when the vibrating element 140 is driven using the PWM signals for comparison, distribution of the signal component is centered on the natural frequency like Gaussian distribution in the range of the horizontal axis value from about 0.85 to about 1.15, whereas the amplitude is random in the range of the horizontal axis value of about 0.85 or less and about 1.15 or more. While the frequency component of the natural vibration in which the horizontal axis value is 1 causes a squeeze effect by vibration being generated highly efficiently, the frequency component in the audible range in which the horizontal axis value is about 0.6 or less generates vibration in the top panel 120 although it is very weak compared to the frequency component of the natural vibration in which the horizontal axis value is 1. While the frequency component of the natural vibration having the horizontal axis value of 1 is ultrasound and is inaudible to humans, the frequency component in the audible range in which the horizontal axis value is about 0.6 or less is audible to humans and becomes unusual noise.

On the other hand, as indicated by the solid line, it can be seen that, when the vibrating element 140 is driven using the PWM signals according to the embodiment, distribution of the signal component is centered on the natural frequency like Gaussian distribution so that clear vibration distribution is obtained. In this case, in the frequency component in the audible range in which the horizontal axis value is about 0.6 or less, the signal component is substantially zero, thereby generating no unusual noise.

In this manner, by making the time point at which one cycle of the modulation signal ends constantly coincide with the time point at which the 10th cycle of the PWM signal ends in the PWM pulse generator 330, occurrence of unusual noise can be suppressed at the time of vibrating the top panel 120.

Note that, as described above, one cycle of the modulation signal is a period corresponding to 487 cycles of the clock, and in the case where the predetermined count value C of the cycle ratio calculator 335 is 50, the cycle ratio calculator 335 calculates the value M, the value N, and the ratio α as follows.

The cycle ratio calculator 335 calculates a value N (9) obtained by dividing the count value (487) input from the counter 334 by the predetermined count value C (50), and a value M (37) representing the remainder. Furthermore, the cycle ratio calculator 335 calculates a ratio α (37/50) by dividing the value M (37) by the predetermined count value C (50).

Furthermore, the width determiner 333 obtains width data as follows. Assuming that the level value indicating the signal level of the modulation signals output from the A/D converter 332 is S(t), a width W indicated by the width data can be expressed by the following formula (3) using the predetermined count value C.

$$W = \frac{(S(t) - 127)}{128} \times \frac{C}{2} + \frac{C}{2} \quad (3)$$

Furthermore, in the case where the correction processing unit 336B of the correction unit 336 corrects the width data by multiplying the width data by the ratio α, the width W obtained by the formula (3) is multiplied by the ratio α.

Next, data to be stored in the memory 250 will be described with reference to FIG. 13. FIG. 13 is a table illustrating data to be stored in the memory 250. As illustrated in FIG. 13, data in which data indicating a type of the application, area data indicating a coordinate value of the area where the GUI operation unit or the like on which operational input is made is displayed, and pattern data indicating a vibration pattern are associated with each other is stored in the memory 250.

Application identification (ID) is illustrated as the data indicating a type of the application. In addition, formulae f1 to f4 representing a coordinate value of the area where the GUI operation unit or the like on which operational input is made is displayed are illustrated as the area data. In addition, P1 to P4 are illustrated as the pattern data indicating a vibration pattern. The pattern data P1 to P4 are data in which amplitude data indicating amplitude values are arranged in time series.

Note that the application indicated by the application ID includes all applications that can be used on a smartphone terminal or a tablet computer, and also includes an email editing mode.

Figure 14:
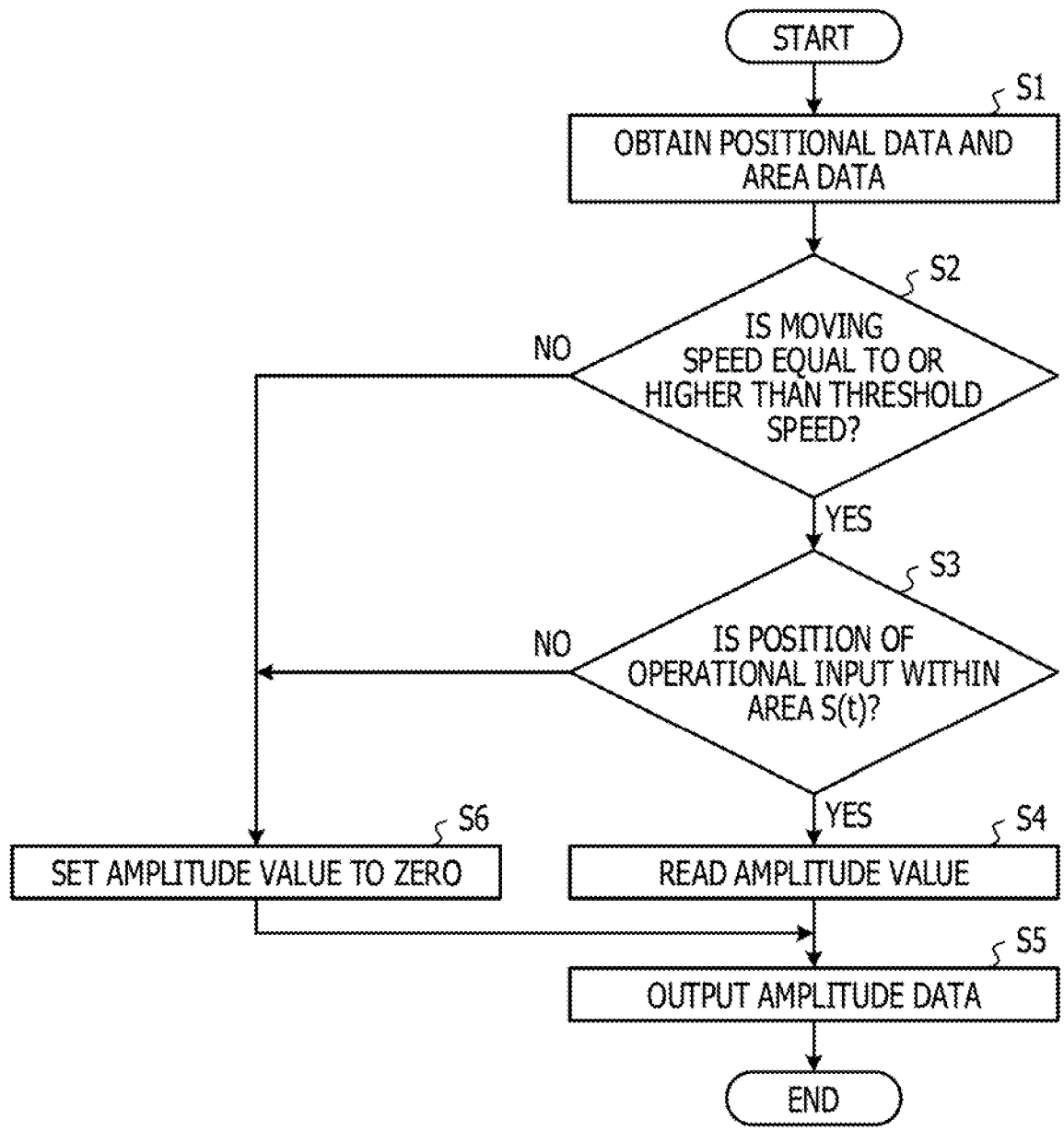
FIG. 14 is a flowchart illustrating a process executed by a drive control unit of a drive controller of the electronic device according to the embodiment.

Next, a process executed by the drive control unit 240 of the drive controller 300 of the electronic device 100 according to the embodiment will be described with reference to FIG. 14. FIG. 14 is a flowchart illustrating a process executed by the drive control unit 240 of the drive controller 300 of the electronic device 100 according to the embodiment.

An operating system (OS) of the electronic device 100 executes control for driving the electronic device 100 for each predetermined control cycle. Accordingly, the drive controller 300 performs computing for each predetermined control cycle. The same applies to the drive control unit 240, and the drive control unit 240 repeatedly executes the flow illustrated in FIG. 14 for each predetermined control cycle.

The drive control unit 240 starts the process when the power of the electronic device 100 is turned on.

The drive control unit 240 obtains area data associated with the vibration pattern for the GUI operation unit on which the current operational input is being made according to the coordinates indicated by the current positional data and the type of the current application (step S1).

The drive control unit 240 determines whether or not the moving speed is equal to or higher than a predetermined threshold speed (step S2). It is sufficient if the moving speed is calculated by vector operation. Note that it is sufficient if the threshold speed is set as the minimum speed of the moving speed of the fingertip at the time when the operational input is made while moving the fingertip, such as what is called flick operation, swipe operation, and drag operation. Such a minimum speed may be set on the basis of experimental results, or may be set according to resolution of the touch panel 150 or the like.

If it is determined that the moving speed is equal to or higher than the predetermined threshold speed in step S2, the drive control unit 240 determines whether or not the position of the operational input indicated by the positional data obtained in step S1 is within an area St indicated by the area data (step S3).

If it is determined that the position of the operational input is within the area St, the drive control unit 240 reads, from the pattern data, the amplitude data indicating the amplitude value corresponding to the moving speed obtained in step S2 (step S4).

The drive control unit 240 outputs the amplitude data (step S5). As a result, the amplitude of the sine wave output from the sine wave generator 310 is modulated in the amplitude modulator 320 to generate modulation signals, and drive signals are generated on the basis of the modulation signals, thereby driving the vibrating element 140.

On the other hand, if it is determined that the moving speed is not equal to or higher than the predetermined threshold speed in step S2 (No in S2), and if it is determined that the position of the operational input is not within the area St in step S3, the drive control unit 240 sets the amplitude value to zero (step S6).

As a result, the drive control unit 240 outputs the amplitude data having the amplitude value of zero, and the amplitude modulator 320 generates modulation signals in which the amplitude of the sine wave output from the sine wave generator 310 is modulated to zero. Accordingly, the vibrating element 140 is not driven in this case.

Figure 15:
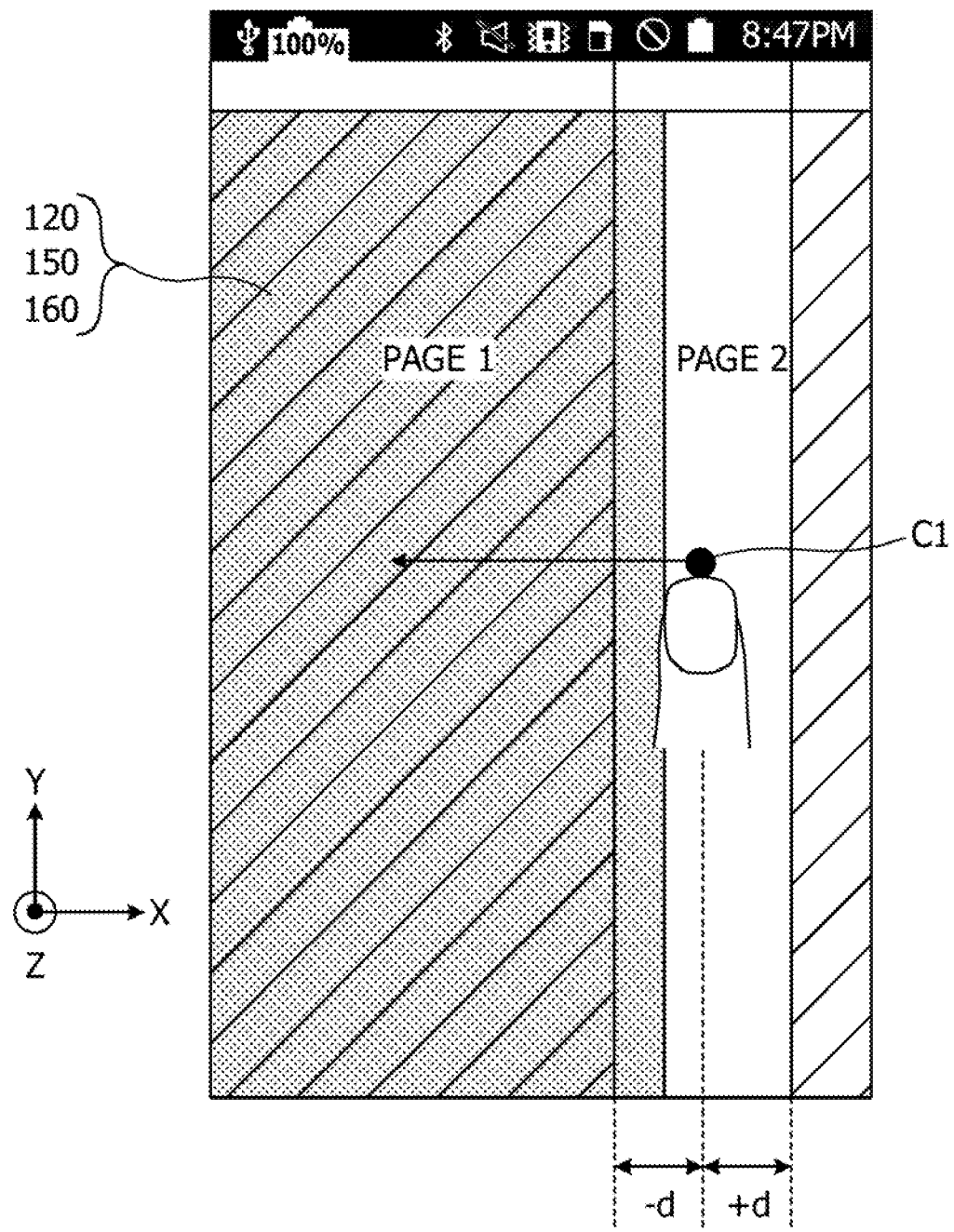
FIG. 15 is a diagram illustrating exemplary operation of the electronic device according to the embodiment.
Figure 16:
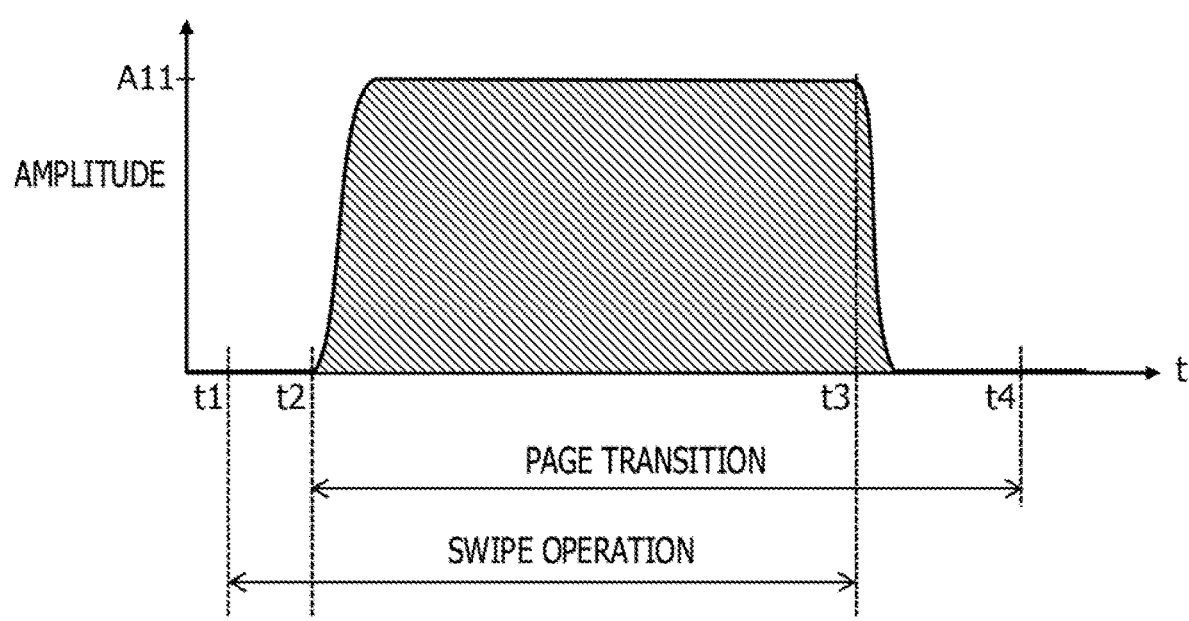
FIG. 16 is a graph illustrating exemplary operation of the electronic device according to the embodiment.

Next, exemplary operation of the electronic device 100 according to the embodiment will be described with reference to FIGS. 15 and 16. FIGS. 15 and 16 are diagrams illustrating exemplary operation of the electronic device 100 according to the embodiment. In FIGS. 15 and 16, the XYZ coordinates similar to those in FIGS. 2 to 4B are defined.

FIG. 15 is a plan view illustrating the top panel 120, the touch panel 150, and the display panel 160, and the user of the electronic device 100 touches the first page illustrated in gray with his/her fingertip and performs swipe operation leftward to open the second page illustrated in white. In other words, the display of the electronic device 100 is about to transition from the first page to the second page.

In the operation mode of performing operation of turning the page as in this case, the drive control unit 240 determines whether the operational input is swipe operation. For example, the drive control unit 240 determines that swipe operation is being performed in the case where the user's fingertip has moved±d mm or more in the X-axis direction from the position where the fingertip has first touched the top panel 120, and vibration is generated in the top panel 120 when the fingertip has entered the area indicated by oblique lines. The area indicated by the oblique lines is the area St.

Here, vibration generated in the top panel 120 by the drive signals output from the drive unit 340 on the basis of the amplitude data output from the drive control unit 240 in the case where the operational input is made as illustrated in FIG. 15 will be described with reference to FIG. 16. In FIG. 16, the horizontal axis represents a time axis, and the vertical axis represents amplitude values of the amplitude data. In addition, the moving speed of the fingertip when the user performs swipe operation is assumed to be substantially constant here.

It is assumed that the user starts to move the fingertip touching a position C1 of the top panel 120 leftward at time t1. Then, at time t2 when the distance d mm is moved from the position C1, the drive control unit 240 determines that the user's input operation is swipe operation, and performs driving with a swipe vibration pattern. The operation distance d mm used to determine the swipe operation corresponds to the moving distance of the fingertip between times t1 and t2. Furthermore, page transition starts at time t2.

The swipe vibration pattern is a drive pattern in which the amplitude is A11 and vibration continues during the swipe operation.

When the user releases the fingertip from the top panel 120 to end the swipe operation at time t3, the drive control unit 240 sets the amplitude value to zero. Accordingly, the amplitude becomes zero immediately after time t3. Furthermore, the page transition is complete at time t4 after time t3.

In this manner, in the case where the user performs swipe operation to turn the page, as an example, the drive control unit 240 outputs the amplitude data having a constant amplitude (A11). Therefore, while the user is performing swipe operation, the dynamic friction force applied to the user's fingertip decreases so that a sense of slipping of the fingertip can be provided to the user, whereby the user can sense that the swipe operation is received by the electronic device 100 with his/her fingertip.

Note that the vibration pattern in the case where the user performs swipe operation to turn the page has been described with reference to FIGS. 15 and 16. However, even in a case where what is called flick operation or operation of moving the fingertip along the surface of the top panel 120 is performed, various kinds of tactile sensation can be provided to the user with the vibrating element 140 being driven.

More specifically, the intensity of the natural vibration may be changed when the position of the operational input moves across the boundary of the GUI operation unit, such as the button 102A (see FIG. 1) displayed on the display panel 160, or when the position of the operational input moves while the GUI operation unit is operated. Furthermore, when the position of the operational input moves within the area of the GUI operation unit of the slider 102B (see FIG. 1) displayed on the display panel 160, the intensity of the natural vibration may be changed according the operation amount of the slider 102B, or may be changed when a scale of the slider 102B is reached.

Here, the position of the vibrating element 140 in the top panel 120, and displacement and curvature of the top panel 120 will be described. Here, it is assumed that the edge of the top panel 120 is a free end when the top panel 120 vibrates.

As described above, according to the drive controller 300, the electronic device 100, and the drive control method according to the embodiment, the time point at which one cycle of the modulation signal ends constantly coincides with the time point at which the 10th cycle of the PWM signal ends, whereby occurrence of unusual noise can be suppressed when the top panel 120 is caused to vibrate. In other words, the length of one cycle of the modulation signal is made equal to the length of 10 cycles of the PWM signal, whereby occurrence of unusual noise can be suppressed when the top panel 120 is caused to vibrate. Moreover, in other words, one cycle of the modulation signal and 10 cycles of the PWM signal are synchronized, whereby occurrence of unusual noise can be suppressed when the top panel 120 is caused to vibrate.

Therefore, according to the embodiment, it becomes possible to provide the drive controller 300, the electronic device 100, and the drive control method in which vibration noise is suppressed.

In the electronic device 100, the frequency for driving the vibrating element 140 is matched with the natural frequency of the top panel 120. Although there may be a case where the top panel 120 has a plurality of natural frequencies instead of one, the natural frequency is determined depending on the Young's modulus E, density ρ, Poisson's ratio δ, long side dimension I, and thickness t of the top panel 120, whereby the natural frequency cannot be set to an optional value. Therefore, the frequency of the sine wave signals output from the sine wave generator 310 needs to be matched with the natural frequency of the top panel 120. The frequency of the modulation signals output from the amplitude modulator 320 is equivalent to the frequency of the sine wave signals.

Under such constraints, matching the cycle of the modulation signal and the period of an integral multiple of the cycle of the PWM signal generated by the PWM pulse generator 330 is extremely difficult as there is a constraint that occurs due to the clock cycle or the like. This is because it is difficult to precisely match the period of an integral multiple of the clock cycle with the cycle of the modulation signal.

Therefore, occurrence of unusual noise can be suppressed when the top panel 120 is caused to vibrate if the time point at which one cycle of the modulation signal ends is made to constantly coincide with the time point at which the 10th cycle of the PWM signal ends by adjusting the period of the 10th cycle of the PWM signal as in the drive controller 300 according to the embodiment.

Note that, although the mode in which the duty ratio is corrected using the counter 334, the cycle ratio calculator 335, and the correction unit 336 has been described above, a configuration in which the duty ratio is not corrected without including the counter 334, the cycle ratio calculator 335, and the correction unit 336 may be adopted. In particular, a configuration in which the duty ratio is not corrected may be adopted as long as no problem is caused in the vibration in a cycle shorter than the predetermined count value C or in a cycle before and after that even if the duty ratio is not corrected.

Furthermore, according to the electronic device 100 of the embodiment, the natural vibration in the ultrasonic band of the top panel 120 is generated to change the dynamic friction force applied to the user's fingertip, whereby favorable tactile sensation can be provided to the user.

Therefore, according to the embodiment, it becomes possible to provide the drive controller 300, the electronic device 100, and the drive control method capable of providing favorable tactile sensation.

Furthermore, in the electronic device 100 according to the embodiment, the amplitude modulator 320 modulates only the amplitude of the sine wave in the ultrasonic band generated by the sine wave generator 310, thereby generating modulation signals. The frequency of the sine wave in the ultrasonic band generated by the sine wave generator 310 is equivalent to the natural frequency of the top panel 120, and the natural frequency is set in consideration of the vibrating element 140.

In other words, the amplitude modulator 320 modulates, without modulating the frequency or phase of the sine wave in the ultrasonic band generated by the sine wave generator 310, only the amplitude to generate modulation signals, and drive signals are generated on the basis of the modulation signals.

Therefore, the natural vibration in the ultrasonic band of the top panel 120 can be generated in the top panel 120, whereby the dynamic friction coefficient at the time when the surface of the top panel 120 is traced with the finger can be reliably decreased using interposition of an air layer based on the squeeze effect. Furthermore, according to the Sticky-band illusion effect or the Fishbone tactile illusion effect, it becomes possible to provide the user with favorable tactile sensation as if unevenness exists on the surface of the top panel 120.

In addition, the mode in which on/off of the vibrating element 140 is switched to provide the user with tactile sensation as if unevenness exists on the top panel 120 has been described above. Turning the vibrating element 140 off means that the amplitude value indicated by the drive signals for driving the vibrating element 140 is set to zero.

However, it is not necessarily required to turn the vibrating element 140 from on to off to provide such tactile sensation. For example, instead of the off state of the vibrating element 140, a state in which the vibrating element 140 is driven with a small amplitude may be used. For example, by reducing the amplitude to about ⅕, the tactile sensation as if unevenness exists on the top panel 120 may be provided to the user in a similar manner to the case where the vibrating element 140 is turned from on to off.

In that case, the vibrating element 140 is driven by drive signals that switches the strength of vibration of the vibrating element 140. As a result, the strength of the natural vibration generated in the top panel 120 is switched, and the tactile sensation as if the unevenness exists can be provided to the user's fingertip.

If the vibrating element 140 is turned off at the time of weakening the vibration to switch the strength of the vibration of the vibrating element 140, on/off of the vibrating element 140 is to be switched. Switching on/off of the vibrating element 140 is to drive the vibrating element 140 intermittently.

Figure 17:
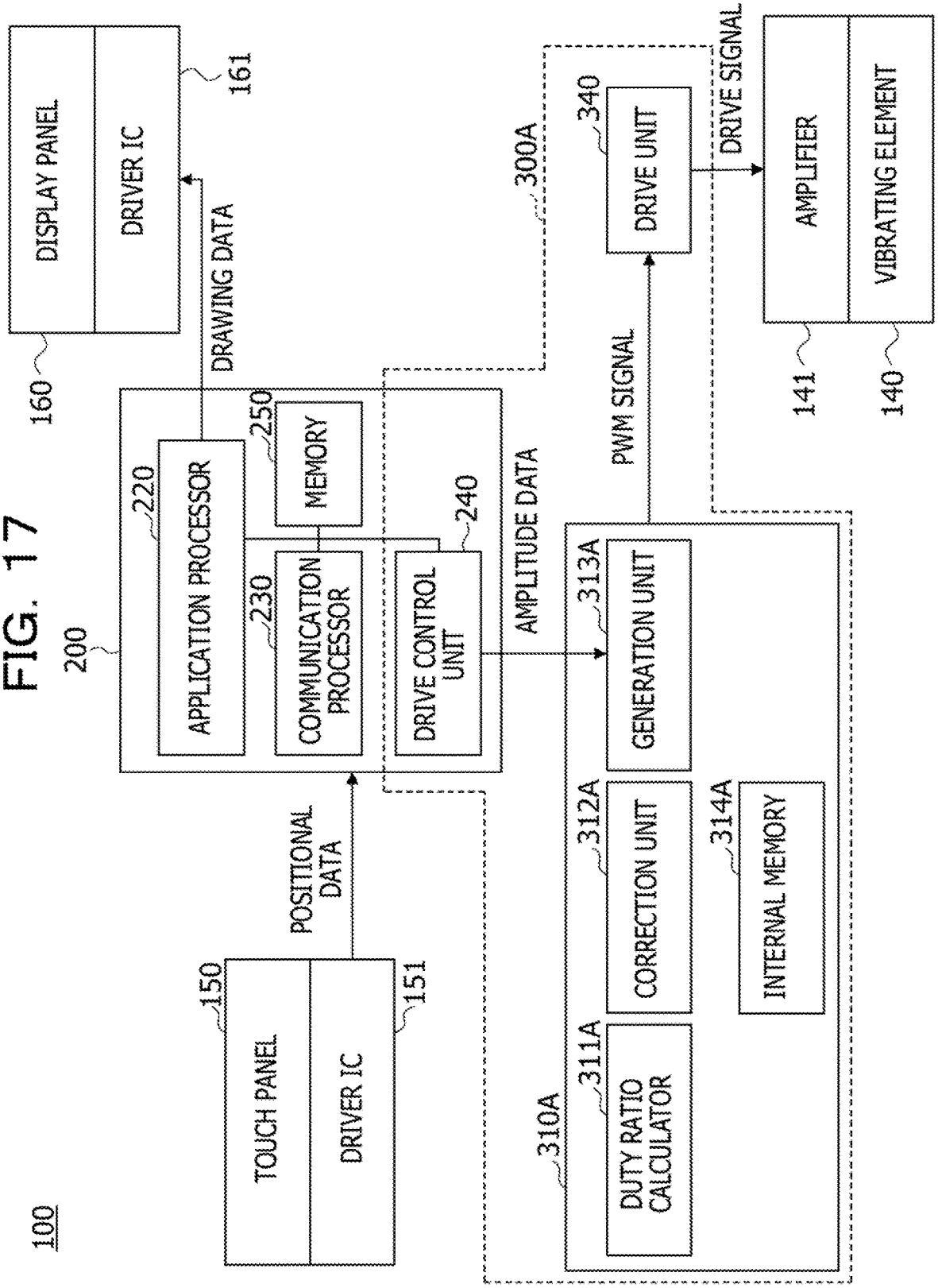
FIG. 17 is a diagram illustrating a configuration of an electronic device according to a variation of the embodiment.

In addition, although the mode in which the drive controller 300 includes the drive control unit 240, the sine wave generator 310, the amplitude modulator 320, the PWM pulse generator 330, and the drive unit 340 has been described above, modification can be made like a drive controller 300A illustrated in FIG. 17.

The drive controller 300A includes the drive control unit 240, a pulse generator 310A, and the drive unit 340. The pulse generator 310A is implemented by a field programmable gate array (FPGA), and is capable of generating PWM signals in a similar manner to generation of PWM signals performed by the sine wave generator 310, the amplitude modulator 320, and the PWM pulse generator 330. Such a pulse generator 310A is implemented by the functions of the sine wave generator 310, the amplitude modulator 320, and the PWM pulse generator 330 being programmed, for example.

In order to implement such functions, the pulse generator 310A includes a duty ratio calculator 311A, a correction unit 312A, a generation unit 313A, and an internal memory 314A.

The internal memory 314A stores the frequency of sine wave signals, the amplitude value (digital value) at the start point and each 50 clocks from the start point, the clock frequency, data indicating the cycle of the sine wave signals by the number of clocks, data indicating the value N, the value M, and the ratio α, and data indicating the formula (3).

It is sufficient if the frequency of sine wave signals and the amplitude value at the start point and each 50 clocks from the start point are data indicating the frequency of the sine wave signals generated by the sine wave generator 310 (see FIG. 7) and the amplitude at the start point and each 50 clocks from the start point. Furthermore, the amplitude of the sine wave signals at the start point and each 50 clocks from the start point is the amplitude of the sine wave signals at the timing when PWM signals rises, as illustrated in FIG. 11.

The clock frequency is the frequency of the clock output from the clock generator 331A (see FIG. 8). The data indicating the frequency of the sine wave signals by the number of clocks is, for example, data indicating that one cycle of the sine wave signal is 487 clocks, as illustrated in FIGS. 10 and 11.

The data indicating the value N, the value M, and the ratio α are data indicating the value N obtained by dividing the number of clocks (487 clocks) in one cycle of the sine wave signal by the predetermined count value C (e.g., 50), the value M indicating the remainder, and the ratio α obtained by dividing the value M by the predetermined count value C (=M/C).

The duty ratio calculator 311A, the correction unit 312A, and the generation unit 313A repeatedly execute the process for each N+1 cycles. Among the N+1 cycles, the length (period) of each cycle from the first to N-th cycles is the period corresponding to 50 clocks, and the length (period) of the N+1-th cycle is the period corresponding to 37 clocks.

This is because the period during which the duty ratio calculator 311A, the correction unit 312A, and the generation unit 313A performs the control process from the first to the N+1-th cycles is matched with one cycle (487 clocks) of the sine wave signal. Note that the first cycle is a cycle from the start point of the sine wave signals until the predetermined count value C (e.g., 50) of the clock elapses.

The duty ratio calculator 311A reads, for each cycle from the first to the N+1-th cycles, the frequency of the sine wave signals, the amplitude at the start point and each 50 clocks from the start point, and the data indicating the formula (3) from the internal memory 314A, calculates a level value, and substituting the level value and the predetermined count value C into the formula (3), thereby calculating the width W. Moreover, the duty ratio calculator 311A obtains a duty ratio (W/C) from the width W and the predetermined count value C.

The correction unit 312A corrects the duty ratio output from the duty ratio calculator 311A once every N+1 cycles, and outputs the same. The correction unit 312A outputs, among the duty ratios output from the duty ratio calculator 311A, the duty ratios from the first to the N-th cycles without making correction, and multiplies the duty ratio of the N+1-th cycle by the ratio α to correct the duty ratio, and outputs the same. The correction unit 312A repeatedly executes such a correction process for each N+1 cycles.

The generation unit 313A outputs PWM signals using the duty ratio output from the correction unit 312A in each cycle from the first to the N-th cycles, and outputs PWM signals using the duty ratio output from the correction unit 312A in the N+1-th cycle. The duty ratio output from the correction unit 312A from the first to the N-th cycles is an uncorrected duty ratio, whereas the duty ratio output from the correction unit 312A in the N+1-th cycle is a duty ratio having been subject to multiplication by the ratio α. The PWM signals output from the generation unit 313A in this manner are input to the drive unit 340.

Accordingly, in a similar manner to the case of using the drive controller 300 illustrated in FIGS. 7 and 8, the period in which the duty ratio calculator 311A, the correction unit 312A, and the generation unit 313A performs the control process from the first to the N+1-th cycle is matched with one cycle (487 clocks) of the sine wave signal, whereby occurrence of unusual noise can be suppressed at the time of vibrating the top panel 120.

Therefore, according to the embodiment, it becomes possible to provide the drive controller 300A, the electronic device 100 including the drive controller 300A, and the drive control method in which vibration noise is suppressed.

Matching the cycle of the modulation signal and the period of an integral multiple of the cycle of the PWM signal generated by the pulse generator 310A is extremely difficult as there is a constraint that occurs due to the clock cycle or the like even if the pulse generator 310A is implemented by the FPGA. This is because it is difficult to precisely match the period of an integral multiple of the clock cycle with the cycle of the modulation signal.

Therefore, occurrence of unusual noise can be suppressed when the top panel 120 is caused to vibrate if the time point at which one cycle of the modulation signal ends is made to constantly coincide with the time point at which the 10th cycle of the PWM signal ends by adjusting the period of the 10th cycle of the PWM signal as in the drive controller 300A according to a variation of the embodiment.

Note that the mode in which the duty ratio calculator 311A, the correction unit 312A, and the generation unit 313A repeatedly execute the process for each N+1 cycles, and the process for the period corresponding to 37 clocks is performed as the N+1-th cycle after performing the process for the period corresponding to 50 clocks of N cycles has been described above. In other words, the mode in which the process for the period corresponding to 37 clocks is performed in the last cycle of N+1 cycles has been described.

However, the process for the period corresponding to 37 clocks may be any one of the first to the N-th cycles instead of the last cycle of N+1 cycles. In such a case, it is sufficient if the correction unit 312A multiplies the duty ratio by the ratio α in the process for the period corresponding to 37 clocks. It is sufficient if it is determined in advance in the pulse generator 310A which cycle is to be the period corresponding to 37 clocks, and data indicating the determined content is stored in the internal memory 314A.

Furthermore, the mode in which one cycle (487 clocks) of the sine wave signal is divided by the predetermined count value C (50 clocks), and the control process is performed for the N+1 periods including the N 50-clock periods and the period of the remaining 37 clocks has been described above.

However, the control process may be performed by dividing one cycle (487 clocks) of the sine wave signal into N periods including the N−1 50-clock periods and the period of 87 clocks. In that case, it is sufficient if the correction unit 312A corrects the duty ratio for a period longer than the predetermined count value C. It is sufficient if a ratio α1 for correction is set to α1=(M+C)/C.

In addition, the mode in which the duty ratio calculator 311A, the correction unit 312A, and the generation unit 313A set the period of one cycle among each N+1 cycles to be a period shorter or longer than the period of other N cycles so that the length of one cycle of the sine wave signal becomes equivalent to the length of the PWM signal of the N+1 cycles has been described above.

However, a period of two or more cycles among each N+1 cycles may be set to be shorter or longer than the period of the remaining cycles so that the length of one cycle of the sine wave signal becomes equivalent to the length of the PWM signal of the N+1 cycles.

Here, a variation of the electronic device 100 (see FIG. 3) according to the embodiment will be described with reference to FIGS. 18 to 21.

Figure 18:
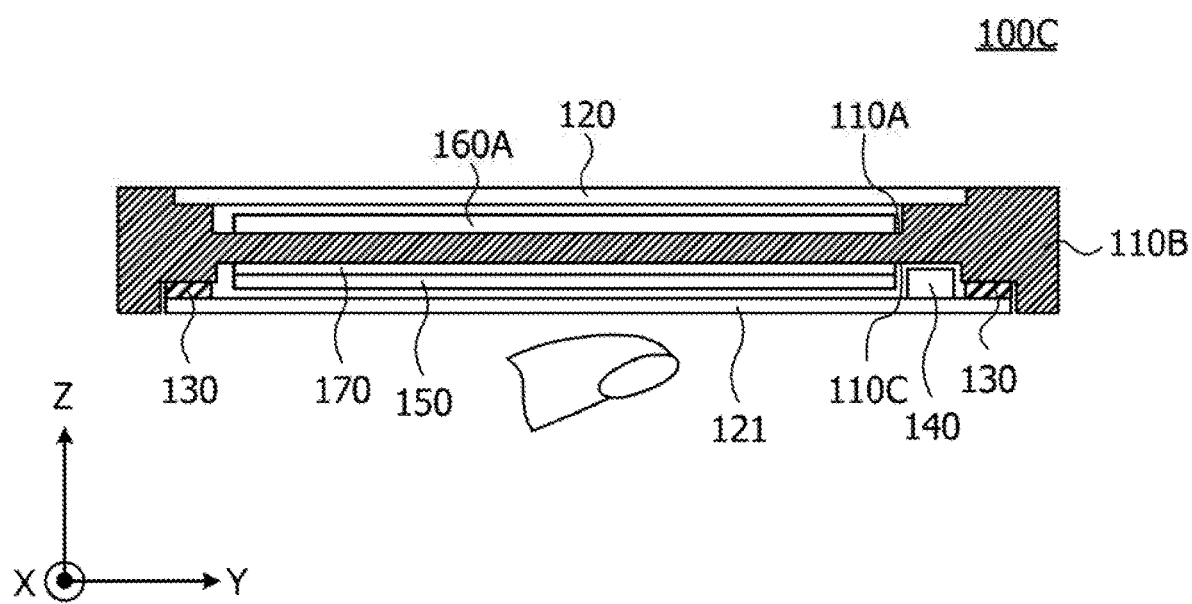
FIG. 18 is a view illustrating a cross section of the electronic device according to the variation of the embodiment.

FIG. 18 is a view illustrating a cross section of an electronic device 100C according to the variation of the embodiment. The cross section illustrated in FIG. 18 is a cross section corresponding to the cross section with arrows taken along line A-A illustrated in FIG. 3. In FIG. 18, the XYZ coordinate system, which is an orthogonal coordinate system, is defined in a similar manner to FIG. 3.

The electronic device 100C includes a housing 110B, the top panel 120, a panel 121, the double-sided tape 130, the vibrating element 140, the touch panel 150, a display panel 160A, and the substrate 170.

The electronic device 100C has a configuration in which the touch panel 150 of the electronic device 100 illustrated in FIG. 3 is provided on the back surface side (Z-axis negative direction side). Accordingly, compared to the electronic device 100 illustrated in FIG. 3, the double-sided tape 130, the vibrating element 140, the touch panel 150, and the substrate 170 are disposed on the back surface side.

The housing 110B has the recess 110A on the Z-axis positive direction side, and a recess 110C on the Z-axis negative direction side. The display panel 160A is disposed inside the recess 110A, which is covered by the top panel 120. Furthermore, inside the recess 110C, the substrate 170 and the touch panel 150 are provided to overlap each other, the panel 121 is fixed to the housing 110B with the double-sided tape 130, and the vibrating element 140 is provided on the surface of the panel 121 on the Z-axis positive direction side.

If on/off of the vibrating element 140 is switched according to operational input to the panel 121 in the electronic device 100C illustrated in FIG. 18 to generate natural vibration in the ultrasonic band in the panel 121, in a similar manner to the electronic device 100 illustrated in FIG. 3, it becomes possible to provide the electronic device 100C in which the user can perceive, with the sense of his/her fingertip, the tactile sensation corresponding to an image displayed on the display panel 160.

Note that, although FIG. 18 illustrates the electronic device 100C including the touch panel 150 provided on the back surface side, the touch panel 150 may be provided on both the front and back surface sides in combination with the structures illustrated in FIGS. 3 and 18.

Figure 19:
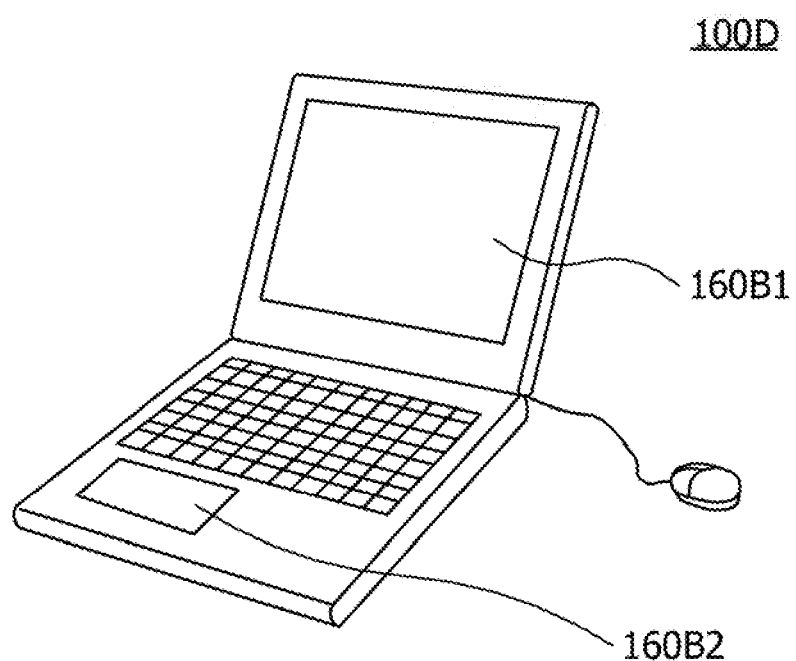
FIG. 19 is a view illustrating the electronic device according to the variation of the embodiment.

FIG. 19 is a view illustrating an electronic device 100D according to a variation of the embodiment. The electronic device 100D is a laptop personal computer (PC). The PC 100D includes a display panel 160B1, and a touch pad 160B2.

Figure 20:
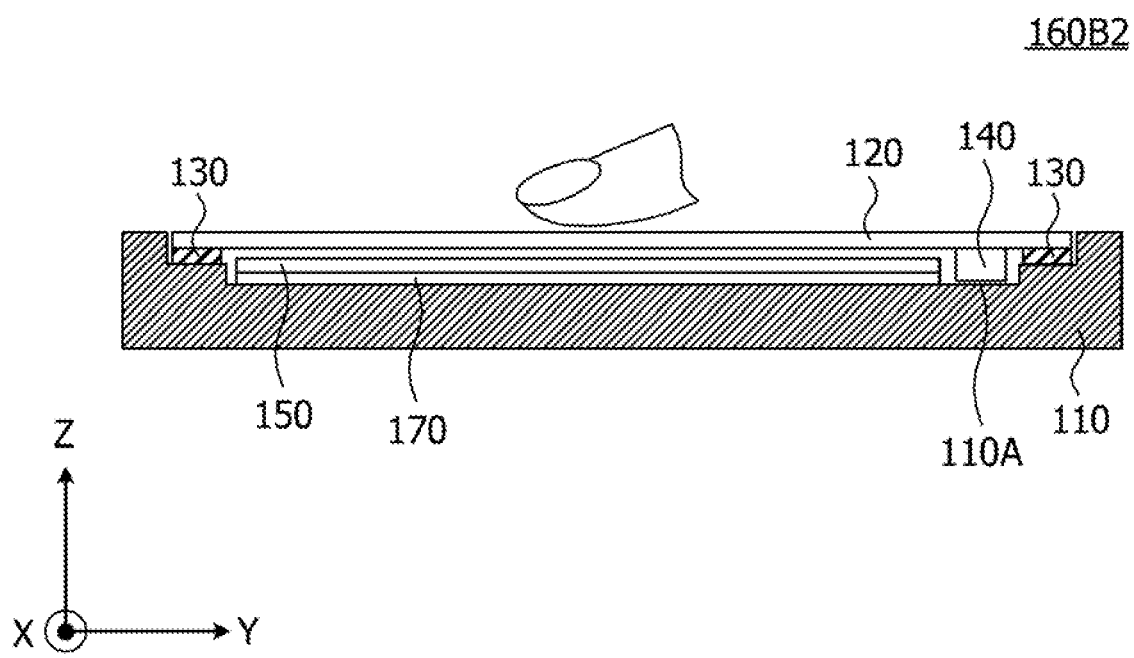
FIG. 20 is a view illustrating a cross section of a touch pad of the electronic device according to the variation of the embodiment.

FIG. 20 is a view illustrating a cross section of the touch pad 160B2 of the electronic device 100D according to the variation of the embodiment. The cross section illustrated in FIG. 20 is a cross section corresponding to the cross section with arrows taken along line A-A illustrated in FIG. 3. In FIG. 20, the XYZ coordinate system, which is an orthogonal coordinate system, is defined in a similar manner to FIG. 3.

The touch pad 160B2 has a configuration in which the display panel 160 is removed from the electronic device 100 illustrated in FIG. 3.

If on/off of the vibrating element 140 is switched according to operational input to the touch pad 160B2 in the electronic device 100D as a PC as illustrated in FIG. 19 to generate natural vibration in the ultrasonic band in the top panel 120, in a similar manner to the electronic device 100 illustrated in FIG. 3, it becomes possible to provide operational feeling to the user's fingertip through tactile sensation according to the amount of movement of the operational input to the touch pad 160B2.

Furthermore, if the vibrating element 140 is provided on the back surface of the display panel 160B1, in a similar manner to the electronic device 100 illustrated in FIG. 3, it becomes possible to provide operation feeling to the user's fingertip through tactile sensation according to the amount of movement of the operational input to the display panel 160B1. In that case, it is sufficient if the electronic device 100 illustrated in FIG. 3 is provided instead of the display panel 160B1.

Figure 21:
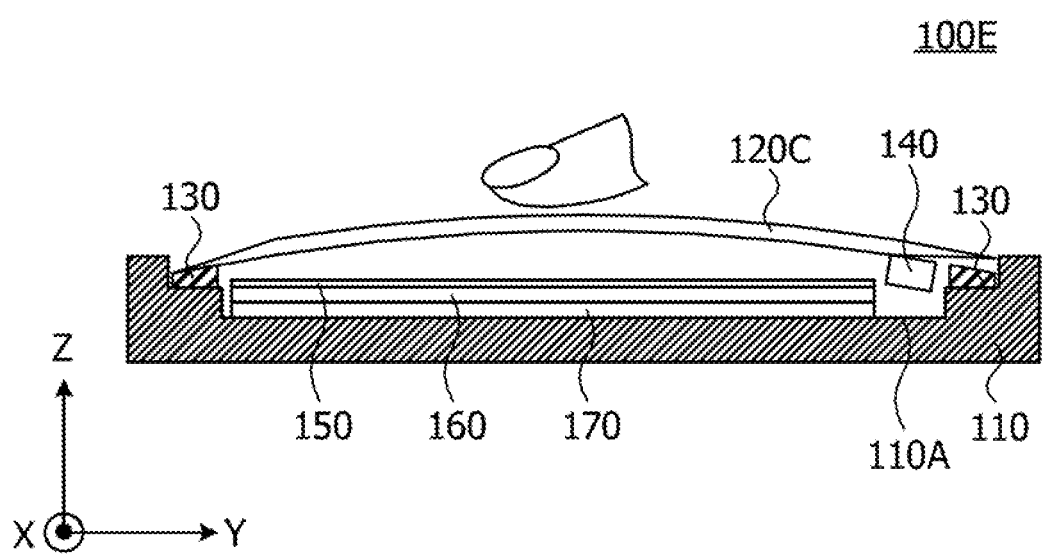
FIG. 21 is a plan view illustrating an operating state of the electronic device according to the variation of the embodiment.

FIG. 21 is a plan view illustrating an operating state of an electronic device 100E according to a variation of the embodiment. The electronic device 100E includes the housing 110, a top panel 120C, the double-sided tape 130, the vibrating element 140, the touch panel 150, the display panel 160, and the substrate 170.

The electronic device 100E illustrated in FIG. 21 has a configuration similar to that of the electronic device 100 according to the embodiment illustrated in FIG. 3 except that the top panel 120C is curved glass.

The top panel 120C is curved such that the center portion in a plan view protrudes in the Z-axis positive direction side. Although FIG. 21 illustrates a cross-sectional shape of the top panel 120C in a YZ plane, a cross-sectional shape in an XZ plane is similar.

By using the top panel 120C made of curved glass in this manner, it becomes possible to provide favorable tactile sensation. This is particularly effective in the case where the actual shape of an object displayed as an image is curved.

Although a drive controller, an electronic device, and a drive control method according to exemplary embodiments of the present invention have been described above, it should be understood that the present invention is not limited to the embodiments disclosed in detail, and the various changes and alterations could be made hereto without departing from the scope of claims.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A drive controller comprising:
   a pulse generator configured to generate a pulse width modulation signal by modifying a period of at least one cycle of a plurality of cycles of the pulse width modulation signal for synchronizing the plurality of cycles of the pulse width modulation signal with one cycle of a drive signal; and
   a drive circuit configured to:
      generate the drive signal based on the pulse width modulation signal generated by the pulse generator, and
      drive a vibration element coupled to a panel of an electronic device on a basis of the generated drive signal for generating vibration in an ultrasonic band on the panel,
   the pulse generator includes:
      a waveform generation circuit configured to generate a waveform signal indicating a waveform of the drive signal in an ultrasonic band,
      a synchronization pulse generation circuit configured to generate a synchronization pulse signal synchronized with a start of a cycle of the waveform signal,
      a pulse output circuit configured to output a pulse signal each time a specific period shorter than one cycle of the waveform signal elapses from the start of the cycle of the waveform signal, and output the pulse signal when the synchronization pulse signal is input,
      a duty ratio acquisition circuit configured to acquire a duty ratio corresponding to an amplitude of the waveform signal, and
      a pulse width modulation signal generation circuit configured to generate, when the pulse signal is input, the pulse width modulation signal having the acquired duty ratio.

2. The drive controller according to claim 1, wherein the pulse generator includes:
   a waveform generation circuit configured to generate a waveform signal indicating a waveform of the drive signal in an ultrasonic band,
   a synchronization pulse generation circuit configured to generate a synchronization pulse signal synchronized with a start of a cycle of the waveform signal,
   a pulse output circuit configured to output a pulse signal each time a specific period shorter than one cycle of the waveform signal elapses from the start of the cycle of the waveform signal, and output the pulse signal when the synchronization pulse signal is input,
   a duty ratio acquisition circuit configured to acquire a duty ratio corresponding to an amplitude of the waveform signal,
   a ratio calculation circuit configured to calculate a ratio of the specific period with respect to a remaining period obtained by removing a plurality of specific periods from a period of one cycle of the waveform signal,
   a correction circuit configured to multiply the acquired duty ratio by the calculated ratio to correct the duty ratio for the remaining period, and
   a pulse width modulation signal generation circuit configured to generate, for the remaining period, the pulse width modulation signal having the corrected duty ratio when the pulse signal is input.

3. A drive controller comprising:
   a pulse generator configured to generate a pulse width modulation signal by modifying a period of at least one cycle of a plurality of cycles of the pulse width modulation signal for synchronizing the plurality of cycles of the pulse width modulation signal with one cycle of a drive signal; and
   a drive circuit configured to:
      generate the drive signal based on the pulse width modulation signal generated by the pulse generator, and
      drive a vibration element coupled to a panel of an electronic device on a basis of the generated drive signal for generating vibration in an ultrasonic band on the panel,
   the pulse generator is configured to adjust a duty ratio of the pulse width modulation signal for changing intensity of the vibration on the panel in accordance with a position of an operational input to the panel and a degree of temporal changes of the position.

4. The drive controller according to claim 1, wherein the drive circuit includes:
a high-side switching element,
a low-side switching element,
a switching element driver configured to drive the high-side switching element and the low-side switching element on a basis of the pulse width modulation signal, and
an output circuit configured to generate the drive signal based on voltage signals output from the high-side switching element and the low-side switching element.

5. The drive controller according to claim 4, wherein the output circuit is a low-pass filter configured to output the drive signal in response to receiving the voltage signals.

6. An electronic device comprising:
a panel;
a vibration element coupled to the panel and the vibration element configured to generate vibration on the panel;
a pulse generator configured to generate a pulse width modulation signal by modifying a period of at least one cycle of a plurality of cycles of the pulse width modulation signal for synchronizing the plurality of cycles of the pulse width modulation signal with one cycle of a drive signal; and
a drive circuit configured to:
generate the drive signal based on the pulse width modulation signal generated by the pulse generator, and
drive the vibration element on a basis of the generated drive signal for generating the vibration in an ultrasonic band on the panel,
the pulse generator includes:
a waveform generation circuit configured to generate a waveform signal indicating a waveform of the drive signal in an ultrasonic band,
a synchronization pulse generation circuit configured to generate a synchronization pulse signal synchronized with a start of a cycle of the waveform signal,
a pulse output circuit configured to output a pulse signal each time a specific period shorter than one cycle of the waveform signal elapses from the start of the cycle of the waveform signal, and output the pulse signal when the synchronization pulse signal is input,
a duty ratio acquisition circuit configured to acquire a duty ratio corresponding to an amplitude of the waveform signal, and
a pulse width modulation signal generation circuit configured to generate, when the pulse signal is input, the pulse width modulation signal having the acquired duty ratio.

7. A computer-implemented drive control method comprising:
perform generation of a pulse width modulation signal by modifying a period of at least one cycle of a plurality of cycles of the pulse width modulation signal for synchronizing the plurality of cycles of the pulse width modulation signal with one cycle of a drive signal;
generating the drive signal based on the generated pulse width modulation signal; and
driving a vibration element by the generated drive signal for generating vibration in an ultrasonic band on a panel of an electronic device,
the generation of the pulse width modulation signal includes:
generating a waveform signal indicating a waveform of the drive signal in an ultrasonic band,
generating a synchronization pulse signal synchronized with a start of a cycle of the waveform signal,
outputting a pulse signal each time a specific period shorter than one cycle of the waveform signal elapses from the start of the cycle of the waveform signal, and output the pulse signal when the synchronization pulse signal is input,
acquiring a duty ratio corresponding to an amplitude of the waveform signal, and
generating, when the pulse signal is input, the pulse width modulation signal having the acquired duty ratio.

8. The drive control method according to claim 7, wherein the generation of the pulse width modulation signal includes:
generating a waveform signal indicating a waveform of the drive signal in an ultrasonic band,
generating a synchronization pulse signal synchronized with a start of a cycle of the waveform signal,
outputting a pulse signal each time a specific period shorter than one cycle of the waveform signal elapses from the start of the cycle of the waveform signal, and output the pulse signal when the synchronization pulse signal is input,
acquiring a duty ratio corresponding to an amplitude of the waveform signal,
calculating a ratio of the specific period with respect to a remaining period obtained by removing a plurality of specific periods from a period of one cycle of the waveform signal,
multiplying the acquired duty ratio by the calculated ratio to correct the duty ratio for the remaining period, and
generating, for the remaining period, the pulse width modulation signal having the corrected duty ratio when the pulse signal is input.

9. The drive control method according to claim 7, wherein the generation of the pulse width modulation signal includes adjusting a duty ratio of the pulse width modulation signal for changing intensity of the vibration on the panel in accordance with a position of an operational input to the panel and a degree of temporal changes of the position.

10. The drive control method according to claim 7, wherein the driving includes:
driving a high-side switching element and a low-side switching element on a basis of the pulse width modulation signal, and
generating the drive signal based on voltage signals output from the high-side switching element and the low-side switching element.

11. The drive control method according to claim 10, wherein the generating of the drive signal based on the voltage signals is performed by a low-pass filter configured to output the drive signal in response to receiving the voltage signals.

* * * * *